(12) United States Patent
Kamada et al.

(10) Patent No.: US 9,738,226 B2
(45) Date of Patent: Aug. 22, 2017

(54) LAYOUT SYSTEM FOR CARGO AREA OF VEHICLE

(71) Applicants: TOYOTA BOSHOKU KABUSHIKI KAISHA, Aichi-ken (JP); KABUSHIKI KAISHA TOYOTA JIDOSHOKKI, Aichi-ken (JP)

(72) Inventors: Kurato Kamada, Aichi-ken (JP); Masanori Saito, Aichi-ken (JP); Masashi Tsuji, Aichi-ken (JP); Hirokazu Niimi, Aichi-ken (JP); Yoshikazu Natsume, Aichi-ken (JP)

(73) Assignees: TOYOTA BOSHOKU KABUSHIKI KAISHA, Aichi-Ken (JP); KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 15/079,102

(22) Filed: Mar. 24, 2016

(65) Prior Publication Data

US 2016/0288721 A1    Oct. 6, 2016

(30) Foreign Application Priority Data

Mar. 30, 2015    (JP) ................. 2015-069114
Mar. 30, 2015    (JP) ................. 2015-069115
Mar. 30, 2015    (JP) ................. 2015-069116

(51) Int. Cl.
*B60N 3/12*    (2006.01)
*B60R 5/04*    (2006.01)
(Continued)

(52) U.S. Cl.
CPC .............. *B60R 5/048* (2013.01); *B60R 5/047* (2013.01); *B60R 7/005* (2013.01); *B60R 21/06* (2013.01)

(58) Field of Classification Search
CPC ... B60L 2200/26; B60M 1/302; B60M 1/305; B60R 19/34; B60R 5/048; B60R 5/047; B60R 7/005; B60R 21/06
(Continued)

(56) References Cited

U.S. PATENT DOCUMENTS 4,351,555 A *    9/1982    Hashimoto ............. B60R 5/044
16/366
4,932,704 A *    6/1990    Ament .................... B60R 5/048
160/84.04
(Continued)

FOREIGN PATENT DOCUMENTS

EP    1 332 919    8/2003
EP    2 329 991    6/2011
JP    2-145538    12/1990

OTHER PUBLICATIONS

Extended European Search Report for EP Appl. No. 16160618.1 dated Sep. 2, 2016.

*Primary Examiner* — Kiran B Patel
(74) *Attorney, Agent, or Firm* — Greenblum & Bernstein, P.L.C.

(57) ABSTRACT

A layout system for a cargo area of a vehicle includes a divider and cargo side-trims. The divider includes a first rod, a second rod, and a screen. The cargo side-trims are installed in the vehicle to form sidewalls of the cargo area. The cargo side-trims include rails that include guide rail portions and rail-side securing portions. The guide rail portions are for guiding end portions of the first and the second rods along a front-rear direction of the vehicle. The guide rail portions include horizontal portion and extending portions that extend from the respective horizontal portions toward a lower rear of the vehicle. The rail-side securing portions are connected to the guide rail portions, respectively. The rail-side securing portions are for holding the end portions of the (Continued)

first and the second rods to secure the first and the second rods to the cargo side-trims.

14 Claims, 14 Drawing Sheets

(51) Int. Cl.
  *B60R 21/06* (2006.01)
  *B60R 7/00* (2006.01)
(58) Field of Classification Search
  USPC .................................................. 296/37.16
  See application file for complete search history.

(56) References Cited

U.S. PATENT DOCUMENTS

| | | | | |
|---|---|---|---|---|
| 5,213,387 | A * | 5/1993 | Decker | B60R 5/047 296/37.16 |
| 5,224,748 | A * | 7/1993 | Decker | B60R 5/047 296/37.16 |
| 5,618,077 | A * | 4/1997 | Ament | B60R 5/047 160/121.1 |
| 5,685,592 | A * | 11/1997 | Heinz | B60N 3/10 224/925 |
| 5,813,449 | A * | 9/1998 | Patmore | B60R 5/047 160/24 |
| 6,050,202 | A * | 4/2000 | Thompson | B60N 3/001 108/144.11 |
| 6,390,526 | B1 * | 5/2002 | Ament | B60R 5/047 160/276 |
| 6,402,217 | B1 * | 6/2002 | Ament | B60R 5/047 296/37.16 |
| 6,416,103 | B1 * | 7/2002 | Laudenbach | B60R 5/047 160/290.1 |
| 7,028,872 | B2 | 4/2006 | Lobanoff | |
| 7,445,262 | B2 * | 11/2008 | Zaiser | B60R 5/047 160/370.22 |
| 7,604,272 | B2 * | 10/2009 | Day | B60R 5/047 296/100.12 |
| 7,621,577 | B2 * | 11/2009 | Schlecht | B60R 5/047 296/24.4 |
| 7,641,256 | B2 * | 1/2010 | Kodaira et al. | B60R 5/048 296/37.1 |
| 8,162,370 | B2 | 4/2012 | Hintennach et al. | |
| 9,637,058 | B1 * | 5/2017 | Garcia Zarco | B60R 5/042 |
| 2003/0062736 | A1 * | 4/2003 | Ulert | B60R 5/047 296/24.43 |
| 2003/0184107 | A1 | 10/2003 | Hapspel et al. | |
| 2004/0020956 | A1 | 2/2004 | Lobanoff | |
| 2008/0277957 | A1 * | 11/2008 | Hirayama | B60R 5/047 296/37.16 |
| 2009/0115216 | A1 * | 5/2009 | Plettrichs | B60R 5/047 296/37.16 |
| 2009/0167043 | A1 * | 7/2009 | Aebker | B60R 5/045 296/37.16 |
| 2011/0133507 | A1 | 6/2011 | Hintennach et al. | |
| 2012/0091745 | A1 * | 4/2012 | Cha | B60R 5/047 296/37.16 |
| 2012/0133171 | A1 * | 5/2012 | Honda | B60R 5/044 296/37.16 |
| 2013/0134734 | A1 * | 5/2013 | Kim | B60R 5/045 296/37.16 |
| 2013/0147225 | A1 * | 6/2013 | Nedelman | B60R 5/047 296/37.16 |
| 2013/0193708 | A1 * | 8/2013 | Lucas | B60R 7/043 296/37.16 |
| 2015/0001874 | A1 * | 1/2015 | Maier | B60R 5/045 296/37.16 |
| 2015/0001875 | A1 * | 1/2015 | Giorgis | B60R 5/045 296/37.16 |

* cited by examiner

LAYOUT SYSTEM FOR CARGO AREA OF VEHICLE

CROSS REFERENCE TO RELATED APPLICATION

This application claims priority from Japanese Patent Applications No. 2015-069114, No. 2015-069115, and No. 2015-069116 filed on Mar. 30, 2015. The entire contents of the priority application are incorporated herein by reference.

TECHNICAL FIELD

The present disclosure relates to a flexible cargo system for a vehicle.

BACKGROUND

Vehicle may include tonneau cover assemblies each including guide rails, a tonneau cover main body, and rods with rollers at ends thereof. The guide rails are mounted to sidewalls in a cargo area of the vehicle. The rods support the tonneau cover main body. The rollers are placed inside the guide rails such that the rollers are movable inside the guide rails.

Users of vehicles may want to alter layouts of cargo areas of the vehicles for various occasions. The known tonneau cover assemblies may include the rods that are movable along the guide rails. However, the rods cannot be secured at various positions. Therefore, the layout of the cargo area cannot be altered in various ways.

SUMMARY

The present invention was made in view of the foregoing circumstances. An object is to provide a layout system that includes a flexible screen and rods that can be secured at various positions to easily alter a layout of a cargo area of a vehicle.

A layout system for a cargo area of a vehicle includes a divider and a pair of cargo side-trims. The divider includes a first rod, a second rod, and a screen having flexibility. The screen is hung between the first rod and the second rod. The cargo side-trims are installed in the vehicle to form sidewalls of the cargo area. The cargo side-trims include rails that include guide rail portions and rail-side securing portions. The guide rail portions are for guiding end portions of the first and the second rods at least along a front-rear direction of the vehicle. The guide rail portions include horizontal portion and extending portions. The extending portions extend from the respective horizontal portions toward a lower rear of the vehicle. The rail-side securing portions are connected to the guide rail portions, respectively. The rail-side securing portions are for holding the end portions of the first and the second rods to secure the first and the second rods to the cargo side-trims.

During moving the end portions of the first rod and the second rod from certain positions to other positions in the rail-side securing portions, the end portions are guided continuously between the horizontal portions and the extending portions. According to the configuration, the end portions are easily moved from the certain positions to others. Therefore, a layout of the cargo area of the vehicle can be easily altered with the divider.

DETAILED DESCRIPTION

An embodiment will be described with reference to FIGS. 1 to 8. The right and the left in FIG. 1 correspond to the rear and the front of a vehicle 10, respectively. Furthermore, the upper side and the lower side in FIG. 1 correspond to the outer side and the inner side of the vehicle 10, respectively.

Figure 1:
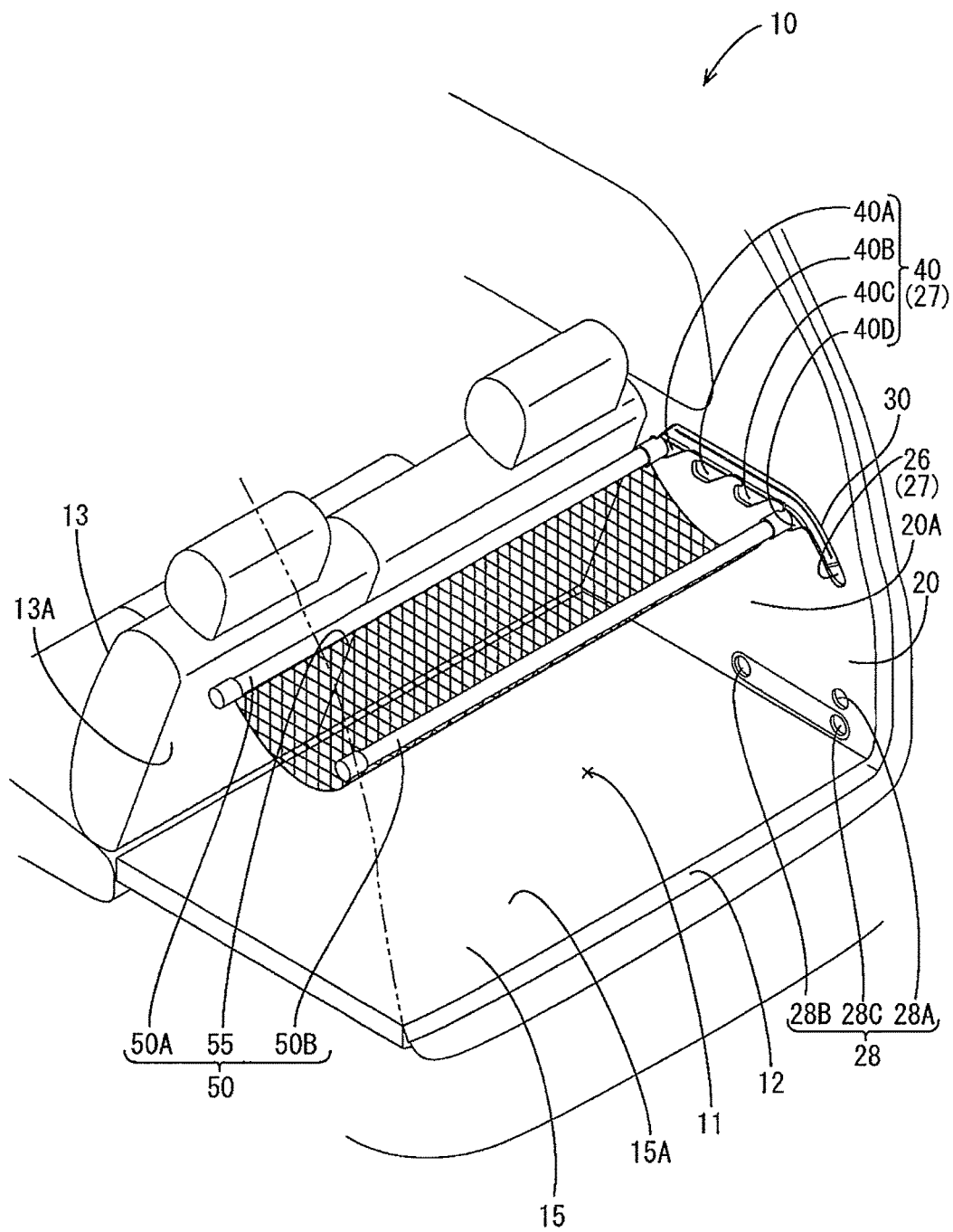
FIG. 1 is a perspective view of a cargo area of a vehicle with a divider in a horizontal position according to an embodiment.
Figure 2:
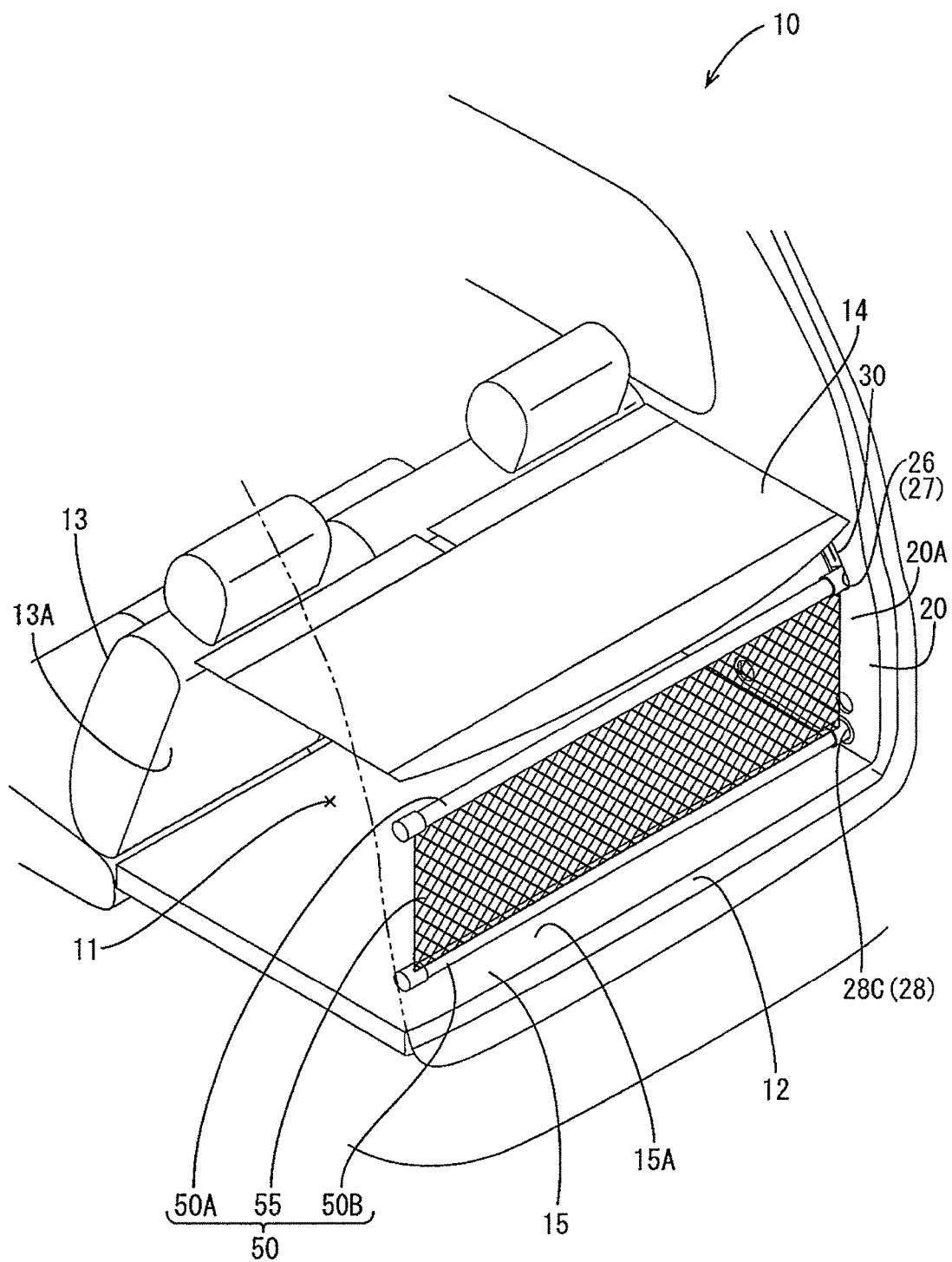
FIG. 2 is a perspective view of the cargo area of the vehicle with the divider in a vertical position.

As illustrated in FIGS. 1 and 2, the vehicle 10 includes a rear cargo area 11 (a vehicle cargo area). The rear cargo area 11 is accessible through a rear opening 12 of the vehicle 10. Rear seats 13 that include rear surfaces 13A that face the rear of the vehicle 10 are disposed in front of the rear cargo area 11. The vehicle 10 includes a tonneau cover 14. The tonneau cover 14 may be arranged in the horizontal position in an upper portion of the rear cargo area 11 and held with a first tonneau cover holder 23A and a second tonneau cover holder 23B (see FIG. 4), which will be described later. The rear cargo area 11 may be used without the tonneau cover 14 for certain layouts.

Sides of the rear cargo area 11 are defined by right and left cargo side-trims, one of which is a cargo side-trim 20 illustrated in FIG. 1. As illustrated in FIG. 1, the bottom and the front of the rear cargo area 11 are defined by a floor surface 15A of a cargo floor board 15 and the rear surfaces 13A of the rear seats 13. In FIG. 1, the left cargo side-trim on the left side of the vehicle 10 is omitted and the cargo side-trim 20 on the right side of the vehicle 10 is illustrated in a simplified form. The cargo floor board 15 is formed in a flat shape and arranged in the horizontal position. Baggage may be placed on the floor surface 15A of the cargo floor board 15. Under the cargo floor board 15, an underfloor storage is provided. The floor board 15 may include a single part or multiple parts.

As illustrated in FIG. 1, the cargo side-trim 20 is a board disposed parallel to the vertical direction and in the front-rear direction of the vehicle 10. The cargo side-trim 20 has an interior surface 20A that is opposed to an interior surface of the left cargo side-trim in the width direction of the vehicle 10 so as to face the space of the rear cargo area 11. The cargo side-trim 20 may be referred to as a trunk side-trim or a luggage side-trim. The cargo side-trim 20 and the left cargo side-trim are symmetric, that is, the left cargo side-trim has a configuration similar to the cargo side-trim 20. Therefore, in the following description, only the cargo side-trim 20 on the right (on the upper side in FIG. 1) will be described in detail and the left cargo side-trim on the left (on the lower side in FIG. 1) will not be described in detail.

Figure 3:
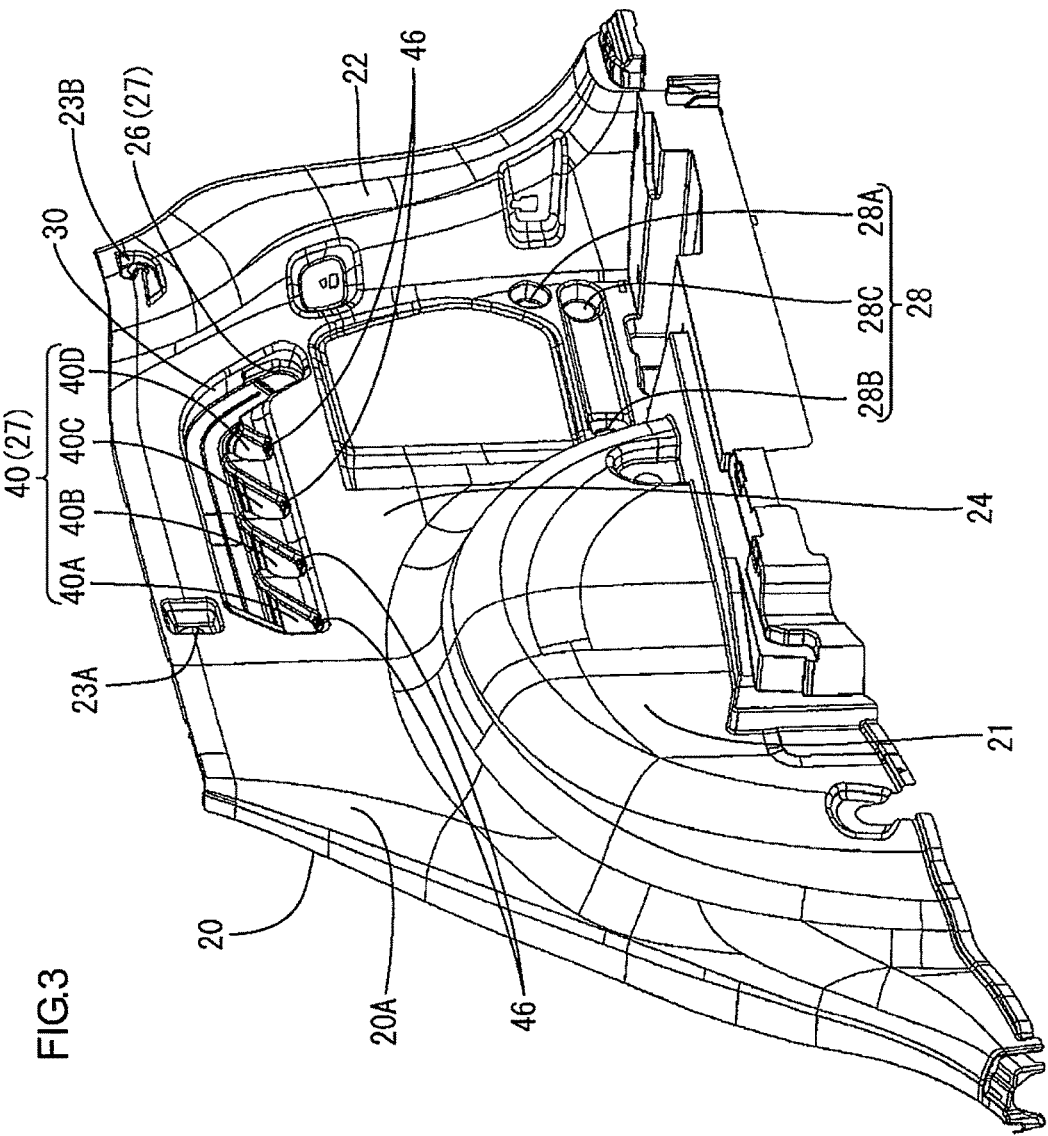
FIG. 3 is a perspective view of a cargo side-trim according to the embodiment.

As illustrated in FIG. 3, the cargo side-trim 20 includes a wheel housing portion 21 at a lower front portion thereof. The wheel housing portion 21 is formed in a shape along a wheel housing. The cargo side-trim 20 includes a rear end portion 22 that is formed along an edge of the rear opening 12. The cargo side-trim 20 includes the tonneau cover holder 23A above the wheel housing portion 22 and the second tonneau cover holder 23B above the rear end portion 22. The first tonneau cover holder 23A and the second tonneau cover holder 23B receive fitting portions of the tonneau cover 14 (not illustrated). With the configuration, the tonneau cover 14 can be stretched along upper edges of the cargo side-trim 20 (see FIG. 2).

The left cargo side-trim includes a wheel hosing portion 21 and a rear end portion 22 formed in the same shapes as those of the cargo side-trim 20 described above, respectively. The cargo side-trim 20 includes a flat portion 24. The flat portion 24 is a portion that does not include the wheel housing portion 21 and the rear end portion 22. The cargo side-trim 20 and the left cargo side-trim are disposed such that the wheel housing portion 21 and the wheel hosing portion of the left cargo side-trim are parallel to each other and the flat portion 24 and the flat portion of the left cargo side-trim are parallel to each other. The cargo side-trim 20 and the left cargo side-trim 20 have structures for holding a first rod 50A and a second rod 50B, which will be described later, such that the first rod 50A and the second rod 50B bridge between the cargo side-trim 20 and the left cargo side-trim. The configuration of the cargo side-trim 20 will be described later.

As illustrated in FIGS. 1 and 2, a divider 50 is installed in the cargo area 11. The divider 50 includes the first rod 50A, the second rod 50B, and a net 55 (a screen). The net 55 has flexibility. The first rod 50A and the second rod 50B bridge between the cargo side-trim 20 and the left cargo side-trim. The net 55 is hung between the first rod 50A and the second rod 50B. When the divider 50 is installed in the rear cargo area 11, the first rod 50A and the second rod 50B are parallel to each other such that the divider 50 is symmetric about an axis of symmetry along the width direction of the vehicle 10. The first rod 50A is in the front and the second rod 50B is in the rear when the end portions 52 thereof are held with a rail-side securing portion 27 and a rail-side securing portion of the left cargo side-trim. The first rod 50A can be held with the rail-side securing portion 27 and the rail-side securing portion of the left cargo side-trim and the second rod 50B can be held with a lower securing portion 28 and a lower securing portion of the left cargo side-trim. The rail-side securing portion 27 and the lower securing portion 28 will be described later. The configurations of the first rod 50A will be described in detail. Because the second rod 50B has a configuration similar to the first rod 50A, the configuration of the second rod 50B will not be described in detail.

Figure 6:
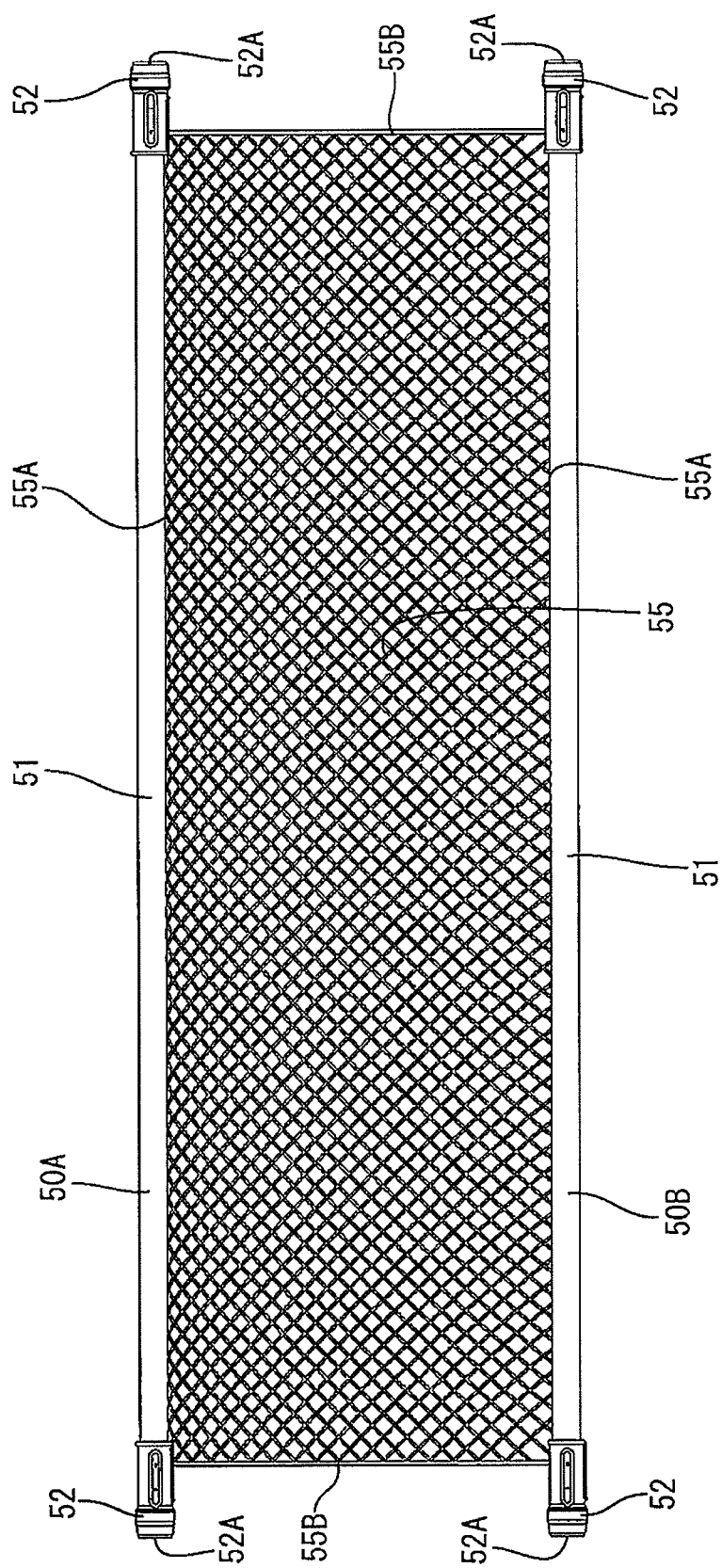
FIG. 6 is a plan view of the divider.

As illustrated in FIGS. 1 and 2, the first rod 50A having a longitudinal shape is placed with the longitudinal direction thereof aligned with the width direction of the vehicle 10 and with tension applied in the directions toward the outer sides of the vehicle 10. In this condition, the first rod 50A is secured to the cargo side-trim 20 and the left cargo side-trim. The second rod 50B is secured to the cargo side-trim 20 and the left cargo side-trim in the same manner. The first rod 50A and the second rod 50B are can be compressed to shorten their length. As illustrated in FIG. 6, the first rod 50A includes a pipe portion 51 and end portions 52 located at ends of the pipe portion 51, respectively. The first rod 50A further includes springs 53 disposed inside the end portions 52, respectively. When first rod 50A is placed between the cargo side-trim 20 and the left cargo side-trim, the springs 53 of the first rod 50A are compressed between the pipe portion 51 and the cargo side-trim 20 and the left cargo side-trim. Tensions are applied to the end portions 52 in directions opposite to the pipe portion 51. Namely, a distance between each end of the pipe portion 51 and an end surface 52A of the end portion 52 at the end of the pipe portion 51 is variable (see FIG. 8). Such a tension mechanism of the first rod 50A at each end portion 52 allows the first rod 50A to smoothly change its length in accordance with changing positions of the end portions 52 of the first rod 50A, which will be described later.

As illustrated in FIGS. 1 and 2, each end portion 52 of the first rod 50A has a cylindrical shape with the end surface 52A having a circular shape. The first rod 50A is placed such that the end surfaces 52A are parallel to a plane that is along the vertical direction and the front-rear direction of the vehicle 10. The first rod 50A is rotatable about a long axis thereof and along the cargo side-trim 20 and can be secured to several positions of the cargo side-trim 20 and the left cargo side-trim. The first rod 50A and the second rod 50B are connected by the net 55. The first rod 50A and the second rod 50B can be independently moved within reach of the net 55.

The net 55 illustrated in FIG. 6 is produced by weaving yarns that have flexibility into a rectangular shape in a plan view. The net 55 includes long edges 55A that are fixed to the pipe portions 51 of the first rod 50A and the second rod 50B, respectively. The net 55 is connected between the first rod 50A and the second rod 50B. The net 55 includes short edges 55B to which flexible yarns are attached. The flexible yarns are connected between the first rod 50A and the second rod 50B. With the flexible yarns, the shape of the net 55 is maintained. The width of the net 55 is larger than a distance between a first front holder 40A of a front securing portion 40 and a rear securing portion 26 or a distance between the rear securing portion 26 and a third lower holder 28C. The front securing portion 40, the rear securing portion 26, and the third lower holder 28C will be described later. Furthermore, how to change the position of the net 55 by moving the first rod 50A and the second rod 50B will be described later.

Figure 4:
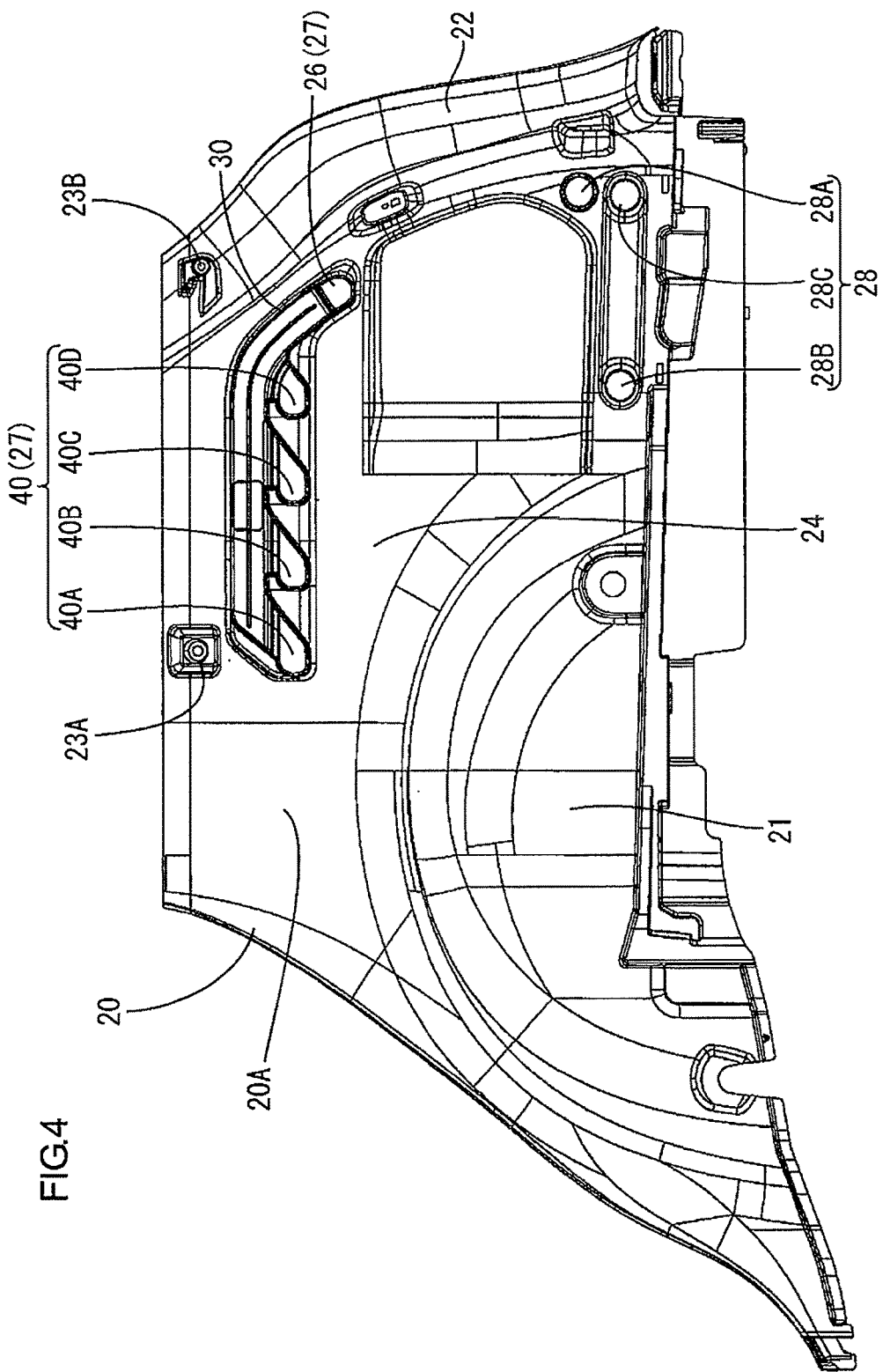
FIG. 4 is an elevational view of the cargo side-trim.

As illustrated in FIGS. 3 and 4, the cargo side-trim 20 includes a rail 1 and a lower securing portion 28. The rail 1 includes a guide rail portion 30 and a rail-side securing portion 27. The guide rail portion 30 is for guiding at least the end portion 52 of the first rod 50A in the front-rear direction of the vehicle 10. The rail-side securing portion 27 includes at least the front securing portion 40 and the rear securing portion 26. The front securing portion 40 includes the first front holder 40A, a second front holder 40B, a third front holder 40C, and a fourth front holder 40D. The rear securing portion 26 includes a holder 26B and a rear boundary protrusion 26A. The first front holder 40A, the second front holder 40B, the third front holder 40C, the fourth front holder 40D, and the rear holder 26B communicate with the guide rail portion 30. The rail-side securing portion 27 is for securing the end portion 52 of the first rod 50A. The lower securing portion 28 is located at a position lower than the rail-side securing portion 27. The lower securing portion 28 is for securing the end portion 52 of the second rod 50B.

The guide rail portion 30, the first to the fourth front holders 40A to 40D of the rail-side securing portion 27, and a first, a second, and a third lower holders 28A, 28B and 28C of the lower securing portion 28 included in the cargo side-trim 20 are recessed from an interior surface 20A of the cargo side-trim 20. The guide rail portion 30, the rail-side securing portion 27, and the lower securing portion 28 are formed during the molding of the cargo side-trim 20. In comparison to a process in which a slide rail and securing members are prepared separately from a cargo side-trim and mounted to the cargo side-trim, the number of parts and the number of steps are reduced.

Figure 5:
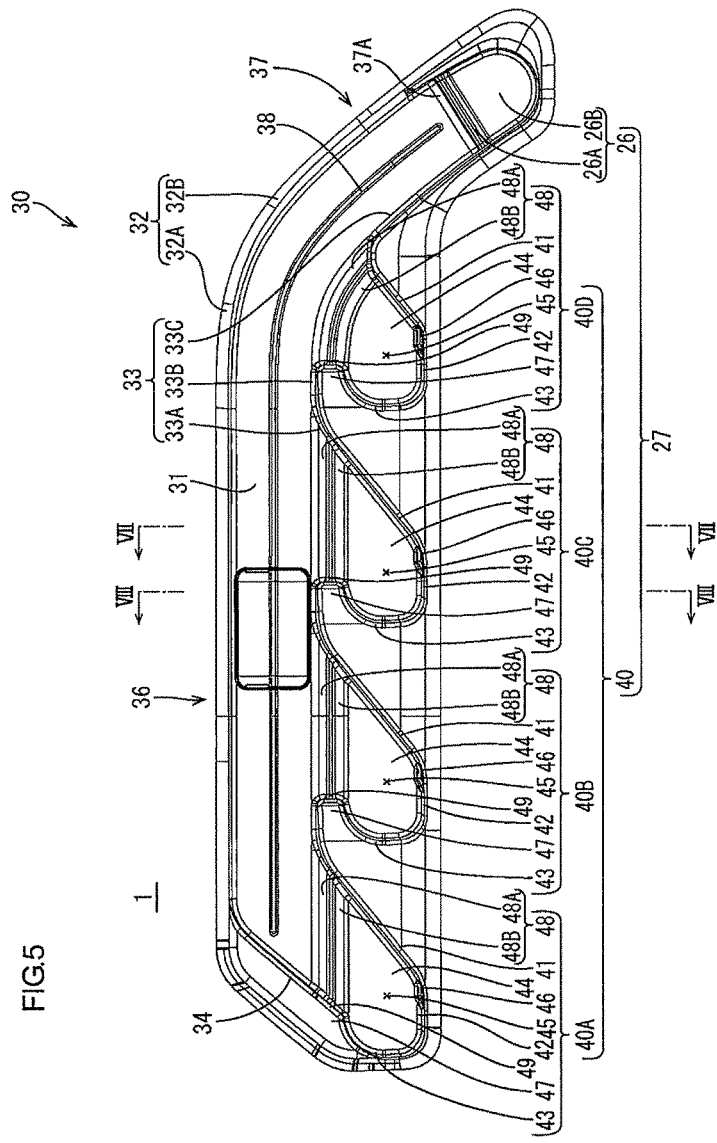
FIG. 5 is a magnified view of a rail included in the cargo side-trim.
Figure 8:
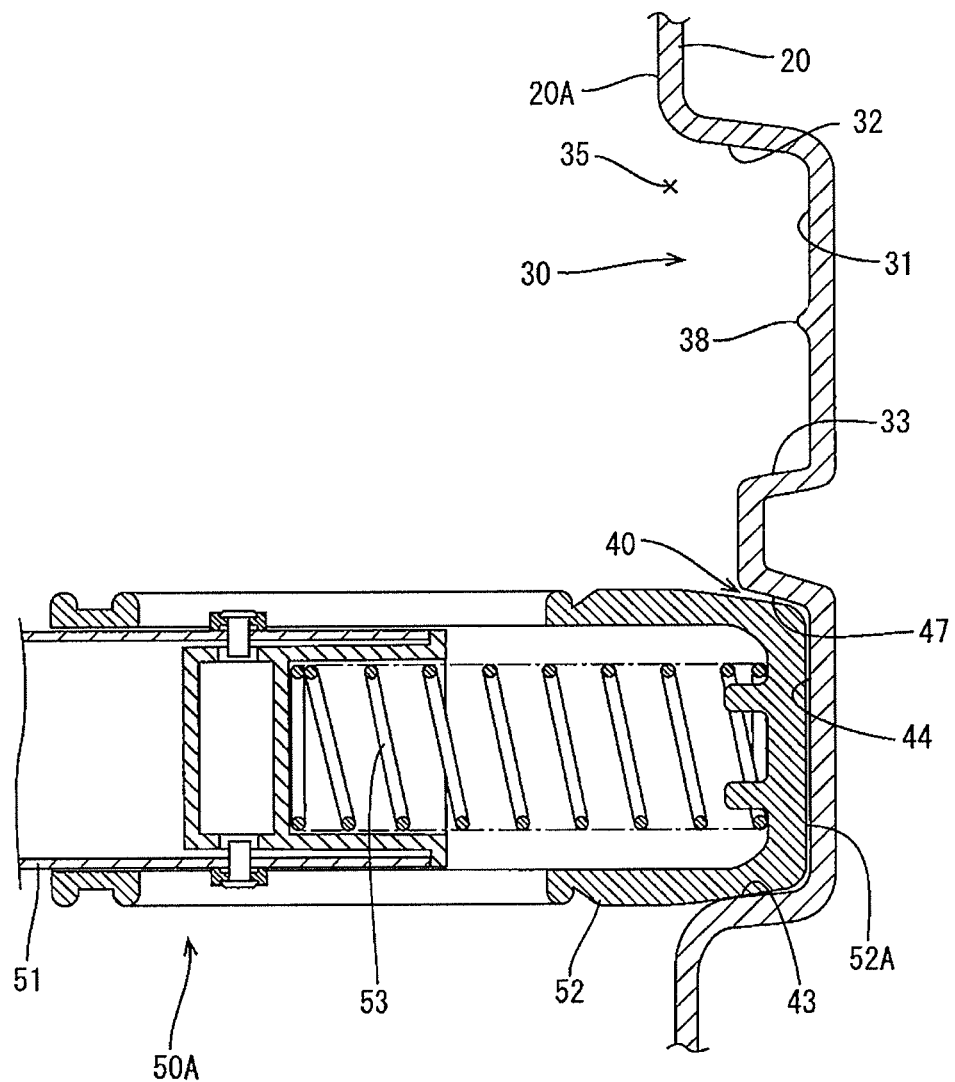
FIG. 8 is a cross-sectional view of the rail along line VIII-VIII in FIG. 5 and the rod.

As illustrated in FIGS. 5 and 8, the guide rail portion 30 includes a groove that extends in the front-rear direction of the vehicle 10. The groove is recessed toward the outer side of the vehicle 10 in the width direction of the vehicle 10. The rail 1 includes a first sidewall 31, a top wall 32, a first bottom wall 33, a sloped front wall 34, sloped walls 41, second bottom walls 42, vertical front walls 43, and second sidewalls 44. The groove of the guide rail portion 30 is defined by the first sidewall 31, the top wall 32, the first bottom wall 33, and the sloped front wall 34. An opening 35 of the groove is in an area of the interior surface 20A between the top wall 32 and the first bottom wall 33. The first sidewall 31 is located more to the outside of the vehicle 10 than the interior surface 20A. The top wall 32 extends from the upper edge of the first sidewall 31 to the interior surface 20A. The first bottom wall 33 extends from the lower edge of the first sidewall 31 to the interior surface 20A. The interior surface 20A, the top wall 32, and the first sidewall 31 form a step. The interior surface 20A, the first bottom wall 33, and the first sidewall 31 form a step. A width of the groove of the guide rail portion 30 (an inner dimension between the top wall 32 and the first bottom wall 33) is defined such that the end portion 52 of the first rod 50A can be placed therein with a clearance.

As illustrated in FIG. 5, the guide rail portion 30 includes a horizontal portion 36 and an extending portion 37. The horizontal portion 36 extends in the horizontal direction. The extending portion 37 extends from a rear end of the horizontal portion 36 and curves downwards toward the lower rear of the vehicle 10. The extending portion 37 communicates with the horizontal portion 36. The extending portion 37 is for guiding the end portion 52 of the first rod 50A between the horizontal portion 36 and the rear securing portion 26.

The top wall 32 includes a horizontal wall portion 32A and a sloped wall portion 32B. The first bottom wall 33 includes voids (junctions 33A), a horizontal wall portion 33B, and a sloped wall portion 33C. The horizontal portion 36 is defined at least by the horizontal wall portion 32A of the top wall 32 and the horizontal wall portion 33B of the first bottom wall 33. The extending portion 37 is defined at least by the sloped wall portion 32B of the top wall 32 and the sloped wall portion 33C of the first bottom wall 33. The first front holder 40A, the second front holder 40B, the third front holder 40C, and the fourth front holder 40D are located lower than the sloped wall portions 33B of the first bottom wall 33.

As illustrated in FIG. 5, the guide rail portion 30 is opened to the rear securing portion 26 at the rear end and closed at the front end. More specifically, the extending portion 37 includes a distal end 37A that opens to the rear securing portion 26 and the horizontal portion 36 includes a sloped front wall 34 that closes the groove of the guide rail portion 30 at the front. The sloped front wall 34 faces a sloped wall 41 of the first front holder 40A, which will be described later. The sloped front wall 34 is connected to the first front holder 40A. The sloped front wall 34 is for guiding the end portion 52 of the first rod 50A between the guide rail portion 30 and the first front holder 40A. According to the configuration, the end portion 52 of the first rod 50A is easily inserted into or pulled out of the first front holder 40A even though the first front holder 40A that is located adjacent to the rear surface 13A of the rear seat 13 is far from the rear opening 12.

As illustrated in FIGS. 5 and 8, the guide rail portion 30 includes a linear protrusion 38 (a rail-side bead) which protrudes from the first sidewall 31 and extends in the longitudinal direction of the guide rail portion 30. The linear protrusion 38 has a convex shape with an arched outline that curves toward the vehicle interior side in a cross section cut along the width direction of the vehicle 10. A top of the linear protrusion 38 is a contact surface that is in contact with the end surface 52A of the first rod 50A. In comparison to a configuration in which a contact surface that is in contact with the end surface 52A of the first rod 50A is a flat surface instead of a ridge, a contact area between the guide rail portion 30 and the end surface 52A is smaller and thus a frictional resistance therebetween is smaller.

The left cargo side-trim includes a slide rail having the same configuration as the guide rail portion 30. The end portions 52 of the first rod 50A are inserted into the guide rail portion 30 through the opening 35 and the side rail of the left cargo side-trim through the opening, respectively. The guide rail portion 30 and the side rail of the left cargo side-trim are located at positions slightly lower than shoulders of a user who has an average height and stands behind the rear opening 12 of the vehicle 10 so that user can easily slide the end portions 52 along the top wall 32 and the top wall of the left cargo side-trim to move the first rod 50A in the front-rear direction of the vehicle 10. The first front holder 40A, the second front holder 40B, the third front holder 40C, and the fourth front holder 40D are connected to the guide rail portion 30 at the junctions 33A.

Figure 7:
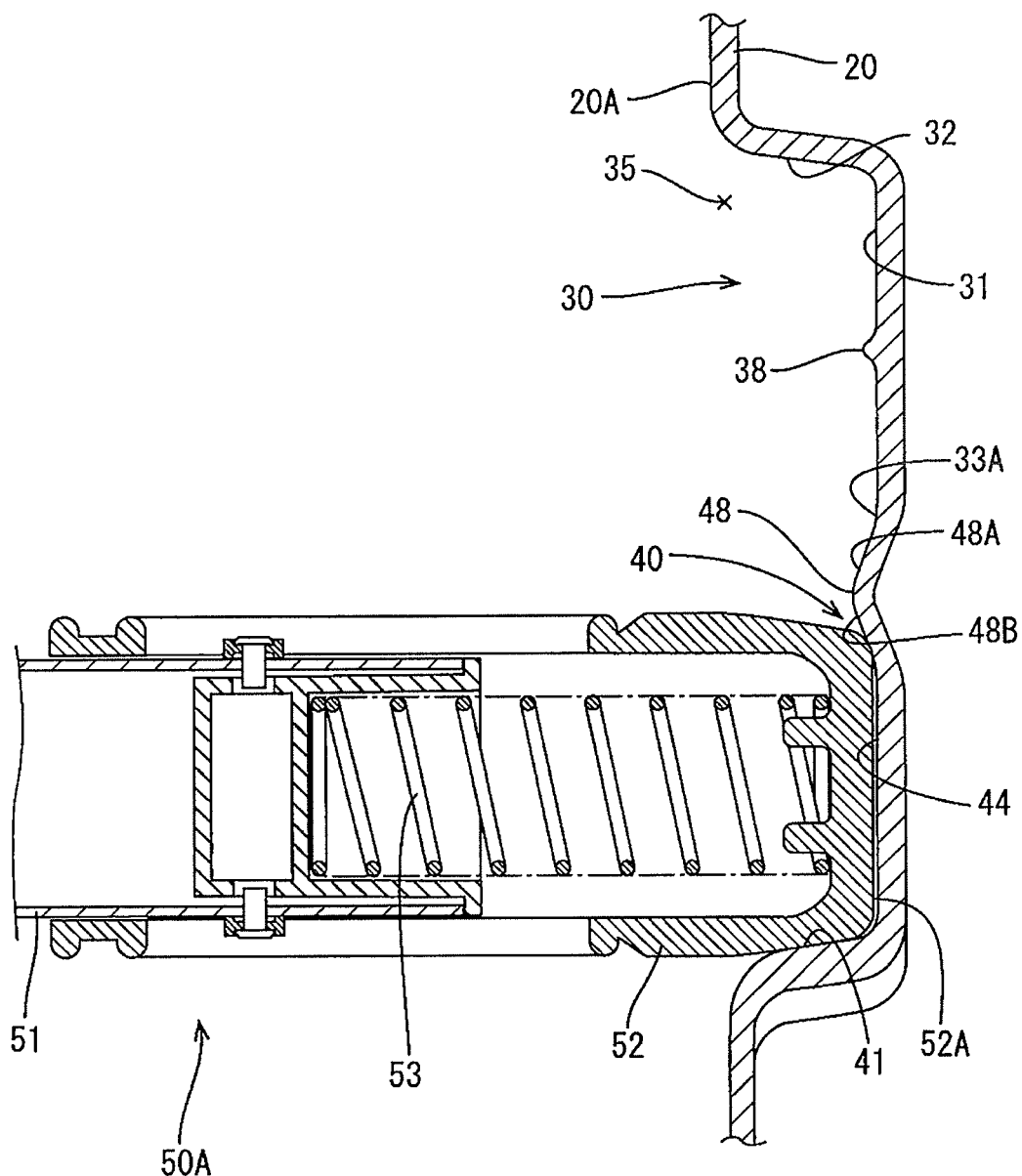
FIG. 7 is a cross-sectional view of the rail along line VII-VII in FIG. 5 and the rod.

As illustrated in FIGS. 5 and 7, the first front holder 40A, the second front holder 40B, the third front holder 40C, and the fourth front holder 40D are located below the horizontal wall portion 33B of the first bottom wall 33 so as to communicate with the guide rail portion 30. The front securing portion 40 is for holding the end portion 52 of the first rod 50A. The first front holder 40A, the second front holder 40B, the third front holder 40C, and the fourth front holder 40D are arranged along the longitudinal direction of the guide rail portion 30 (or the horizontal portion 36 of the guide rail portion 30, that is, in the front-rear direction of the vehicle 10). The first front holder 40A, the second front holder 40B, the third front holder 40C, and the fourth front holder 40D are arranged at equal intervals between the front end and the rear end of the guide rail portion 30. Any one of pairs of the first front holder 40A and the first front holder of the left cargo side-trim, the second front holder 40B and the second front holder of the left cargo side-trim, the third front holder 40C and the third front holder of the left cargo side-trim, and the fourth front holder 40D and the fourth front holder of the left cargo side-trim can be selected by the user for holding the first rod 50A.

As illustrated in FIG. 5, the front securing portion 40 includes sloped walls 41, second bottom walls 42, and stoppers 47. The sloped walls 41 are sloped with respect to the front-rear direction of the vehicle 10. The second bottom walls 42 continue from lower ends of the sloped walls 41, respectively, and include surfaces for holding the end portions 52 thereon. The stoppers 47 are located opposite the respective sloped walls 41 and above the first front holder 40A, the second front holder 40B, the third front holder 40C, and the fourth front holder 40D. The stoppers 47 project from upper ends of the respective vertical front walls 43 toward the respective sloped walls 41. The stoppers 47 are for restricting the end portion 52 of the first rod 50A held on a surface of the second bottom wall 42 from moving upward and out of the front securing portion 40. The front securing portion 40 includes boundary protrusions 48 that are located at borders between the guide rail portion 30 and the first front holder 40A, the second front holder 40B, the third front holder 40C, and the fourth front holder 40D. The boundary protrusions 48 protrude from the first sidewall 31 of the guide rail portion 30 and extend along the longitudinal direction of the guide rail portion 30.

As illustrated in FIGS. 5 and 7, each sloped wall 41 connects to the corresponding first bottom wall 33. More specifically, the top end of the sloped wall 41 connects to the corresponding first bottom wall 33 at the rear edge of the junction 33A. The sloped wall 41 forms a downslope from the rear to the front of the vehicle 10. The sloped wall 41 connects to the guide rail portion 30 at a position (at the junction 33A) which is more to the rear than a corresponding one of holding cavities 45, which will be described later. According to the configuration, the user can easily secure the first rod 50A to the front securing portion 40 through the rear opening 12 even through the front securing portion 40 is far from the rear opening 12. A slope angle of the sloped wall 41 relative to the front-rear direction of the vehicle 10, that is, to the longitudinal direction of the guide rail portion 30 (or the first bottom wall 33) is about 45 degrees.

As illustrated in FIGS. 5 and 8, the second bottom walls 42 extend in the horizontal direction. A dimension of each second bottom wall 42 in the horizontal direction is about the same as an outer diameter of the end portion 52 of the first rod 50A. The front securing portion 40 includes vertical front walls 43 and second sidewalls 44. Each vertical front wall 43 extends upward from a front edge of the corresponding second bottom wall 42. Each sidewall 44 extends upward from an outer edge of the corresponding second bottom wall 42 at an end of the corresponding second bottom wall 42 in the width direction of the vehicle 10. The front securing portion 40 includes the holding cavities 45 into which the end portion 52 is inserted. Each holding cavity 45 is defined by the sloped wall 41, the second bottom wall 42, the vertical front wall 43, and the stopper 47 of each one of the front holders 40A to 40D. The holding cavities 45 are located above the respective second bottom walls 42. The second sidewalls 44 are formed such that surfaces thereof and the surface of the first sidewall 31 of the guide rail portion 30 are on the same plane. The front securing portion 40 includes protrusions 46 at ends of the sloped walls 41.

As illustrated in FIGS. 3 and 5, the protrusions 46 protrude from the second bottom walls 42, respectively. Specifically, each protrusion 46 is formed at a border between the corresponding second bottom wall 42 and the corresponding sloped wall 41 at which the second bottom wall 42 and the sloped wall 41 form an obtuse angle. The protrusions 46 extend from the respective second sidewalls 44 in the width direction of the vehicle 10, that is, the protrusions 46 are linear protrusions (or beads). A surface of each protrusion 46 closer to the corresponding second bottom wall 42 is in contact with an outer peripheral surface of the end portion 52 of the first rod 50A when the end portion 52 is placed on the second bottom wall 42. The protrusions 46 function as second stoppers for restricting the end portion 52 of the first rod 50A from moving toward the sloped wall 41.

As illustrated in FIGS. 5 and 8, the stoppers 47 are located above and opposite the respective second bottom walls 42. The stoppers 47 define upper ends of the respective holding cavities 45 that have outlines of letter J, respectively, in a plan view. Each stopper 47 extends in a length from the upper end of the vertical front wall 43 over the end portion 52 of the first rod 50A such that a distal end of the stopper 47 is on a vertical line that crosses a center axis of the end portion 52 that is placed on the second bottom wall 42. The length of each stopper 47 is not limited to the length described above. As long as the stopper 47 covers at least a part of the end portion 52 of the first rod 50A on the second bottom wall 42, the stopper 47 exerts the function of restricting the end portion 52 from moving out of the holding cavity 45 at a certain extent. With the stopper 47 having the length such that the distal end of the stopper 47 is on the vertical line that crosses the center axis of the end portion 52, the upper surface of the end portion 52 of the first rod 50A is in contact with the stopper 47 rather than the front surface of the end portion 52 when the end portion 52 moves upward. According to the configuration, the end portion 52 is more properly restricted from moving out of the holding cavity 45.

As illustrated in FIG. 5, the stoppers 47 are separated from one another such that the end portion 52 of the first rod 50A is passed through a gap between each stopper 47 and the corresponding sloped wall 41. In a path between the front securing portion 40 (or each holding cavity 45) and the guide rail portion 30 in which the end portion 52 of the first rod 50A moves, a portion between the stopper 47 and the sloped wall 41 is a narrow portion (or a bottle neck portion). The second front holder 40B, the third front holder 40C, and the fourth front holder 40D have vertical walls 49, respectively. Each vertical wall 49 extends upward from a rear end of the corresponding stopper 47 to the first bottom wall 33 at the front end of the junction 33A. According to the configuration, the end portion 52 of the first rod 50A easily enters the second front holder 40B, the third front holder 40C, or the fourth front holder 40D and the end portion 52 in the holding cavity 45 of the second front holder 40B, the third front holder 40C, or the fourth front holder 40D is less likely to move out of the holding cavity 45 unexpectedly.

As illustrated in FIG. 5, an upper end and a lower end of each boundary protrusion 48 continue to the corresponding first bottom wall 33 of the guide rail portion 30 and the corresponding stopper 47, respectively. The boundary protrusion 48 extends between the front and the rear ends of the corresponding junction 33A. As illustrated in FIG. 7, the boundary protrusions 48 include rail-side sloped walls 48A and securing portion-side sloped walls 48B. The rail-side sloped walls 48A are down-sloped toward the interior side of the vehicle 10. The securing portion-side sloped walls 48B are down-sloped toward the exterior side of the vehicle 10. The securing portion-side sloped walls 48B face the front securing portion 40. A slope angle of each rail-side sloped wall 48A and a slope angle of the corresponding securing portion-side sloped wall 48B are the same. The boundary protrusions 48 protrude toward the interior side of the vehicle 10. A force required for moving the end portion 52 of the first rod 50A from the guide rail portion 30 to the front securing portion 40 (or from the front securing portion 40 to the guide rail portion 30) can be adjusted according to the slope angle of each rail-side sloped wall 48A (or the slope angle of each securing portion-side sloped wall 48B).

As illustrated in FIG. 5, the rear securing portion 26 is located lower than the front securing portion 40 and connected to the distal end 37A of the extending portion 37. The rear securing portion 26 is for holding the end portion 52 of the first rod 50A. The rear holder 26B is recessed toward the exterior side of the vehicle 10 in a shape along the outline of the end portion 52 of the first rod 50A. The rear securing portion 26 includes inner surfaces that are linearly connected to a surface of the first bottom wall 33 and a surface of the top wall 32. More specifically, the inner surfaces of the rear securing portion 26 are connected to an inner surface of the sloped wall portion 32B of the top wall 32 of the extending portion 37 and an inner surface of the sloped wall portion 33C of the first bottom wall 33 of the extending portion 37. The rear securing portion 26 includes the rear boundary protrusion 26A that defines a boundary between the rear securing portion 26 and the guide rail portion 30. The rear boundary protrusion 26A protrudes from the first sidewall 31 and extends so as to close the distal end 37A of the extending portion 37. The shape of the rear boundary protrusion 26A is similar to the shape of the boundary protrusion 48 and thus will not be described.

As illustrated in FIG. 4, the cargo side-trim 20 includes a rear end portion 22 that is curved toward the front of the vehicle 10 such that the upper edge of the rear end portion 22 is more to the front of the vehicle 10 than the lower edge of the rear end portion 22. In comparison to a configuration in which the rear securing portion 26 is arranged at the same vertical position as the front securing portion 40, the rear securing portion 26 can be arranged more to the rear by setting the vertical position of the rear securing portion 26 lower than the front securing portion 40. The rear end portion 22 of the cargo side-trim 20 includes the second tonneau cover holder 23B. The rear securing portion 26 is arranged below the second tonneau cover holding portion 23B.

As described earlier, the rail-side securing portion 27 includes the front securing portion 40 and the rear securing portion 26. The lower securing portion 28 is arranged at the lower end portion of the cargo side-trim 20 and more to the rear than a wheel housing 21.

As illustrated in FIG. 4, the lower securing portion 28 includes a first lower holder 28A, a second lower holder 28B, and a third lower holder 28C. The first lower holder 28A is arranged on an upper side and the second lower holder 28B and the third lower holder 28C are arranged on a lower side. The second lower holder 28B and the third lower holder 28C are separated from each other in the front-rear direction of the vehicle 10. The first lower holder 28A has a round shape in a plan view and a depth in the width direction of the vehicle 10. An overall shape of the first lower holder 28A is along the end portion 52 of the second rod 50B. The second lower holder 28B and the third lower holder 28C have shaped along the end portion 52 of the second rod 50B with depths in the width direction of the vehicle 10. The lower securing portion 28 includes a lower guide rail that has a depth smaller than the depths of the second lower holder 28B and the third lower holder 28C. The lower guide rail is connected between the second lower holder 28B and the third lower holder 28C.

The end portion 52 of the first rod 50A can be tightly placed in one of the front holders 40A, 40B, 40C, and 40D of the rail-side securing portion 27 and the second rod 50B can be tightly placed in another one of the holders 40B, 40C, 40D, and 26 for a horizontal arrangement of the divider 50. The first rod 50A can be tightly placed in one of the holders 40A, 40B, 40, 40D, and 26 and the second rod 50B can be tightly placed in one of the holders 28A, 28B, and 28C of the lower securing portion 28 for a vertical arrangement of the divider 50.

Changing a layout of the rear cargo area 11 by securing the first rod 50A and the second rod 50B to different holders 40A, 40B, 40C, 40D, 26, 28A, 28B, and 28C will be described. In a first example, how the first rod 50A is tightly placed in the second front holder 40B and then moved from the second front holder 40B to the guide rail portion 30 and released will be described. How to secure the first rod 50A to another holders 40A, 40C, 40D, or 26 is similar to how to secure the first rod 50A to the second front holder 40B and thus will not be described.

To insert the first rod 50A into the second front holder 40B, the end portion 52 of the first rod 50A is inserted into the guide rail portion 30 and then slid in the horizontal direction toward the second front holder 40B. At the junction 33A between the guide rail portion 30 and the second front holder 40B, the direction of sliding the end portion 52 is changed from the horizontal direction to a downward direction toward the lower front of the vehicle 10 to insert the end portion 52 into the second front holder 40B along the sloped wall 41. The first rod 50A shrinks when it hits the rail-side sloped wall 48A of the boundary protrusion 48 and continues shrinking with the end portion 52 of the first rod 50A pushed by the rail-side sloped wall 48A that is sloped from the junction 33A toward the inner side of the vehicle 10 until the end portion 52 reaches the boundary protrusion 48. When the first rod 50A is further moved such that the end portion 52 slides on the sloped wall 41, the first rod 50A extends as a pushing force applied to the end portion 52 by the securing portion-side sloped wall 48B that is sloped from the boarder portion 48 toward the outer side of the vehicle 10 decreases until the end portion 52 reaches the second bottom wall 42 and the end portion 52 is placed on the second bottom wall 42. The other end portion 52 of the first rod 50A is placed on the second bottom wall of the left cargo side-trim in the same manner. While the end portions 52 are placed on the second bottom wall 42 and the other second bottom wall, respectively, the end portions 52 are pressed against the second sidewall 44 and the second sidewall of the left cargo side-trim, respectively. The first rod 50A is positioned relative to the front-rear direction, the top to bottom direction, and the width direction of the vehicle 10, namely, the first rod 50A is restricted from moving to those directions. However, the first rod 50A is not restricted from moving to the upper rear direction of the vehicle 10 (or a direction parallel to the sloped wall 41). When the end portions 52 are placed on the second bottom wall 42 and the second bottom wall of the left cargo side-trim, respectively, the end portion 52 are held in the second front holder 40B and the second front holder of the left cargo side-trim, respectively, and the first rod 50A is secured to the cargo side-trim 20 and the left cargo side-trim.

To release the first rod 50A, the first rod 50A is pulled toward the upper rear of the vehicle 10 and slid toward the guide rail portion 30 along the sloped wall 41. During the sliding of the first rod 50A, the end portion 52 is pulled out of the second front holder 40B and the other end portion is pulled out of the other second front holder. During the pulling the end portion 52 out of the second front holder 40B, the end portion 52 is pushed by the securing portion-side sloped wall 48B and thus the first rod 50A is compressed until the end portion 52 reaches the boundary protrusion 48. As the first rod 50A is further pulled such that the end portion 52 slides on the sloped wall 41, a pushing force applied to the end portion 52 by the rail-side sloped wall 48A decreases and the first rod 50A extends until it reaches the guide rail portion 30 through the junction 33A. When the end portion 52 reaches the guide rail portion 30, the end portion 52 is released from the second front holder 40B. The other end portion of the first rod 50A is released from the other second front holder in the same manner.

According to the configuration described above, it is not necessary to remove the first rod 50A from the guide rail portion 30 or the rail-side securing portion 27 to move the end portion 52 from one of the holders 40A, 40B, 40C, 40D, and 26 to another one of those. If securing or releasing of the first rod 50A requires pressing of the end portion 52 by a hand to compress the first rod 50A until the end portion 52 is placed inner of the rear cargo area 11 than the interior surface 20A of the cargo side-trim 20, the securing or the releasing of the first rod 50A is more complicated. According to the configuration described above, such complicated work is not required for securing or releasing the first rod 50A. Furthermore, precise positioning of the end portion 52 relative to the holding cavity 45 of the rail-side securing portion 27 is not required for securing the first rod 50A to the first securing portion 40 because the end portion 52 is guided by the guide rail portion 30 or the sloped wall 41.

Next, the layout of the rear cargo area 11 with the divider 50 in the horizontal arrangement and the layout of the rear cargo area 11 with the divider 50 in the vertical arrangement will described.

First, the layout of the rear cargo area 11 with the divider 50 in the horizontal arrangement illustrated in FIG. 1 will be described. As illustrated in FIG. 1, the end portion 52 of the first rod 50A is tightly placed in the first front holder 40A and end portion 52 of the second rod 50B is tightly placed in the fourth front holder 40D. The end portions 52 of the first rod 50A and the second rod 50B are tightly placed in the first front holder 40A and the fourth front holder 40D, respectively, as described earlier. The net 55 droops due to its weight, that is, the net 55 is in a form of a hammock. With the divider 50 in the horizontal arrangement, the rear cargo area 11 is divided into an upper cargo area and a lower cargo area. The upper cargo area is above the divider 50 and the lower cargo area is between the floor surface 15A of the cargo floor board 15 and the divider 50. Although an upper space of the rear cargo area 11 tends to be a dead space, the upper space can be effectively used with the divider 50.

The end portion 52 of the second rod 50B may be tightly placed in the rear holder 26B and the other rear holder. An arrangement of the divider 50 with the end portions 52 of the second rod 50B tightly placed in the rear holder 26B and the rear holder of the left cargo side-trim may be referred to as the horizontal arrangement. As illustrated in FIG. 4, the rear holder 26B is located below the second tonneau cover holder 23B. According to the configuration, a space is provided between a rear end portion of the tonneau cover 14 and the second rod 50B in a size sufficient for inserting a hand of the user or a small object. Namely, the user can easily place an object on the net 55 or remove from the net 55 with the tonneau cover 14 placed in the rear cargo area 11.

In the horizontal arrangement, a dimension of the divider 50 in the front-rear direction of the vehicle 10 or a depth of the net 55, that is, division of the rear cargo area 11 in the horizontal direction can be altered by changing the securing positions of the first rod 50A and the second rod 50B. The rail-side securing portion 27 in this embodiment includes five holders 40A, 40B, 40C, 40D, and 26B. The layout of the rear cargo area 11 can be changed by selecting any two of the holders 40A, 40B, 40C, 40D, and 26B and securing the first rod 50A and the second rod 50B thereto. According to the configuration, flexibility in layout of the rear cargo area 11 is provided.

Next, the layout of the rear cargo area 11 with the divider 50 in the vertical arrangement illustrated in FIG. 2 will be described. As illustrated in FIG. 2, the end portion 52 of the first rod 50A is tightly placed in the rear holder 26B and the end portion 52 of the second rod 50B is tightly placed in the third lower holder 28C. The end portions 52 of the first rod 50A and the second rod 50B are tightly placed in the rear holder 26B and the third lower holder 28, respectively, as described earlier. If the end portion 52 of the second rod 50B is in the second lower holder 28B, the second rod 50B is moved from the second lower holder 28B to the third lower holder 28C along the lower guide rail. If the end portion 52 of the second rod 50B is not in the second lower holder 28B, the end portion 52 of the second rod 50B is held in the third lower holder 28C. The other end portion 52 of the second rod 50B is pressed and the second rod 50B is compressed. The other end portion 52 of the second rod 50B is held in the other third lower holder 28C. Alternatively, the other end portion 52 of the second rod 50B may be held in the other third lower holder first, the end portion 52 is pressed to shrink the second rod 50B, and the end portion 52 is held in the third lower holder 28C. The net 55 is hung from the first rod 50A so as to extend in the vertical direction and the width direction of the vehicle 10. Namely, a lower portion of the rear opening 12 of the rear cargo area 11 is closed with the net 55 and thus an object placed on the floor surface 15A of the cargo floor board 15 is less likely to drop out of the rear cargo area 11 through the rear opening 12.

When the divider 50 is placed in the vertical position with the end portion 52 of the second rod 50B held with the lower securing portion 28, the rear cargo area 11 is divided into a front area and a rear area. If a large object is placed under the cargo floor board 15, for example, if a full-sized spare tire that is larger than a space-saver spare tire is placed under the cargo floor board 15, the second lower holder 28B and the third lower holder 28C may not be used. Even in such a case, the end portion 52 of the second rod 50B can be tightly placed in the first lower holder 28A.

For the vertical arrangement of the divider 50, the end portion 52 of the first rod 50A is tightly placed in one of the holders 40A, 40B, 40C, 40D, and 26B of the rail-side securing portion 27 and the end portion 52 of the second rod 50B is tightly placed in one of the lower holders 28A, 28B, and 28C of the lower securing portion 28 are selected. With the divider 50, the rail-side securing portion 27, and the lower securing portion 28, the layout of the rear cargo area 11 can be changed in various ways. The net 55 may have a width that is not sufficient for placing the second rod 50B in the third lower holder 28C when the end portion 52 of the first rod 50A is tightly placed in the first front holder 40A.

Next, functions and effects of this embodiment will be described.

During movement of the first rod 50A to secure the first rod 50A to the rear holder 26B, the end portion 52 of the first rod 50A is guided to the rear securing portion 26 continuously by the horizontal portion 36 of the guide rail portion 30 and the extending portion 37. Namely, the end portion 52 of the first rod 50A is easily moved from the front securing portion 40 to the rear securing portion 26.

The rear securing portion 26 is arranged lower than the front securing portion 40. This enables flexible layout design for the rear cargo area 11. The flat portion 24 of the cargo side-trim 20 may include an opening to access a storage space or lamps behind the cargo side-trim. Therefore, the guide rail portion 30 needs to be arranged in an area of the cargo side-trim 20 which does not include the opening. Furthermore, the rear end portion 22 of the cargo side-trim 20 is curved toward the front of the vehicle 10 along the outline of the vehicle 10 such that the upper edge of the rear end portion 22 is more to the front of the vehicle 10 than the lower edge of the rear end portion 22. Namely, the cargo side-trim 20 has structural limitations for arrangement of the guide rail portion 30. The horizontal portion 36 of the guide rail portion 30 is formed along the upper edge of the flat portion 24 and the extending portion 37 of the guide rail portion 30 is formed along the rear end portion 22. According to the configuration, the holders 40A, 40B, 40C, 40D, and 26B of the rail-side securing portion 27 can be arranged away from one another in a relatively large area.

The extending portion 37 extends from the horizontal portion 36 toward the lower rear of the vehicle 10 and includes the top wall 32. Because the end portion 52 of the first rod 50A is pressed by the top wall 32 and due to the weight of the first rod 50A, the end portion 52 of the first rod 50A is less likely to move to the horizontal portion 36. According to the configuration, the end portion 52 is less likely to come off even if vibrations are produced during driving.

The divider 50 can be set in both horizontal position and vertical position. This provides flexibility in layout change of the rear cargo area 11.

The holders 40A, 40B, 40C, and 40D communicate with the guide rail portion 30. Therefore, the end portion 52 of the first rod 50A is easily moved from one position to another through the guide rail portion 30. Namely, the securing position of the first rod 50A is easily changeable and thus the layout of the rear cargo area 11 can be easily altered.

The front securing portion 40 includes sloped walls 41 and the stoppers 47. With the sloped walls 41, the end portion 52 of the first rod 50A is easily moved between the front securing portion 40 and the guide rail portion 30. With the stoppers 47, the end portion 52 of the first rod 50A is less likely to move upward even if vibrations are produced during driving. According to the configuration, the position of the first rod 50A can be easily changed to alter the layout of the rear cargo area 11 and the first rod 50A remains properly secured during driving.

The front securing portion 40 includes the protrusions 46 on the second bottom walls 42, respectively. With the protrusions 46, the end portion 52 of the first rod 50A placed on one of the second bottom walls 42 is less likely to move toward the corresponding sloped wall 41, that is, the first rod 50A is properly secured.

The front securing portion 40 includes the boundary protrusions 48. With the boundary protrusions 48, the end portion 52 of the first rod 50A in the guide rail portion 30 is less likely to unintentionally move from the guide rail portion 30 to the front securing portion 40 or the end portion 52 in the front securing portion 40 is less likely to come off of the front securing portion 40.

Each boundary protrusion 48 includes the rail-side sloped wall 48A and the securing portion-side sloped wall 48B. With the rail-side sloped wall 48A and the securing portion-side sloped wall 48B, the end portion 52 of the first rod 50A can be easily moved between the guide rail portion 30 and the front securing portion 40.

Another embodiment will be described with reference to FIGS. 9 to 14. In the following description, the right and the left in FIG. 11 are referred to the front and the rear side of a vehicle 110. FIG. 11 is a view from the interior side of the vehicle 100.

Figure 9:
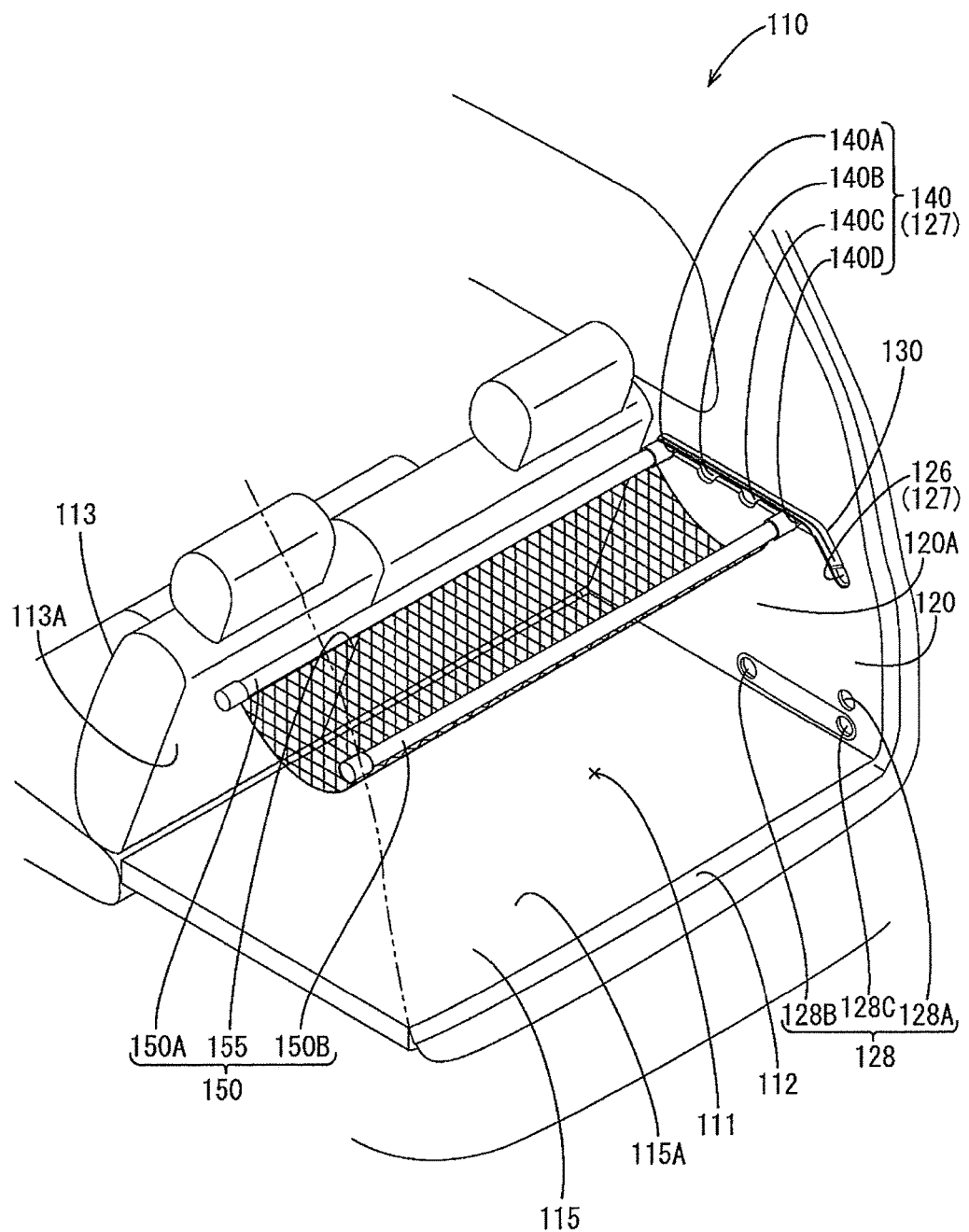
FIG. 9 is a perspective view of a cargo area of a vehicle with a divider in a horizontal position according to another embodiment.
Figure 10:
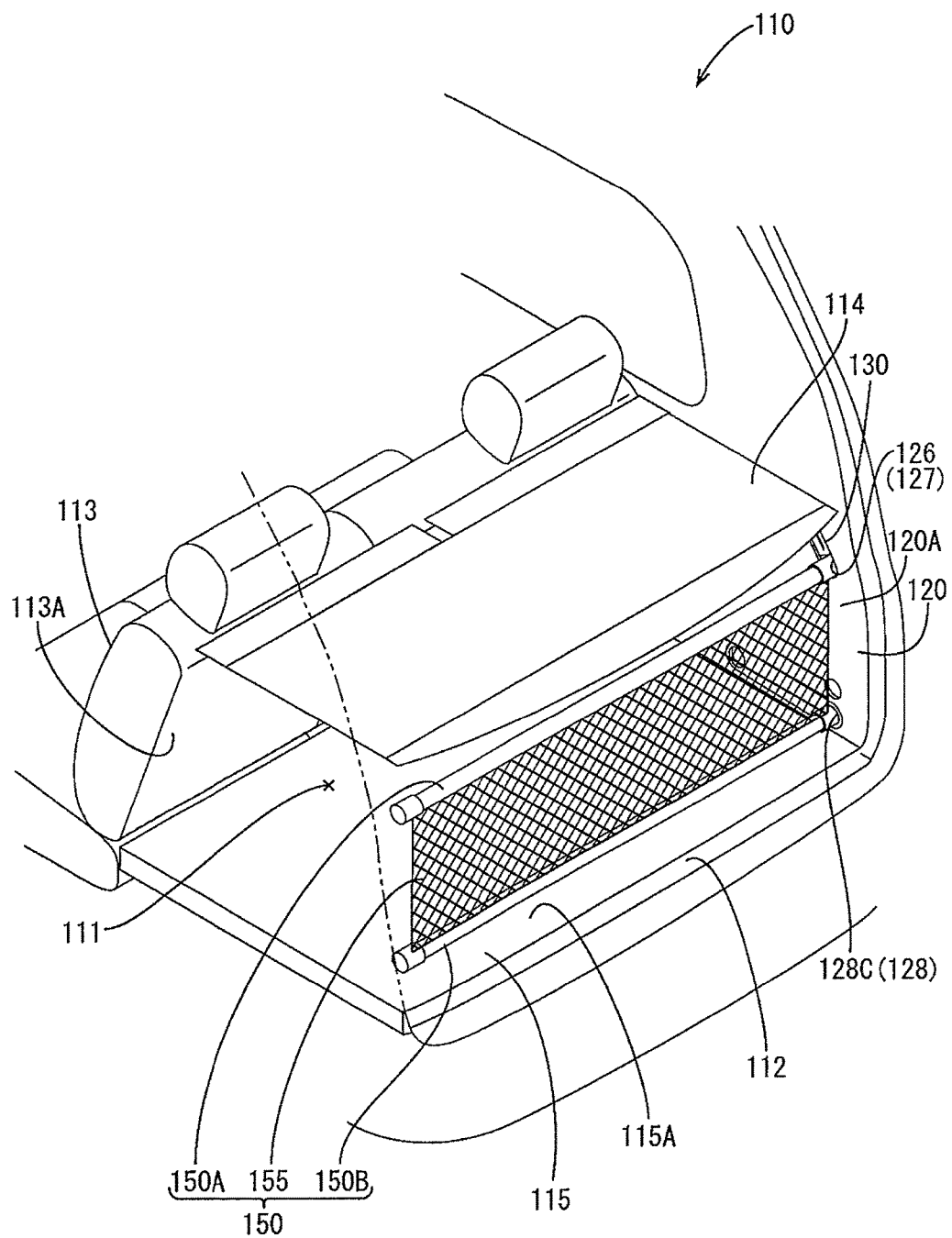
FIG. 10 is a perspective view of the cargo area of the vehicle with the divider in a vertical position.
Figure 11:
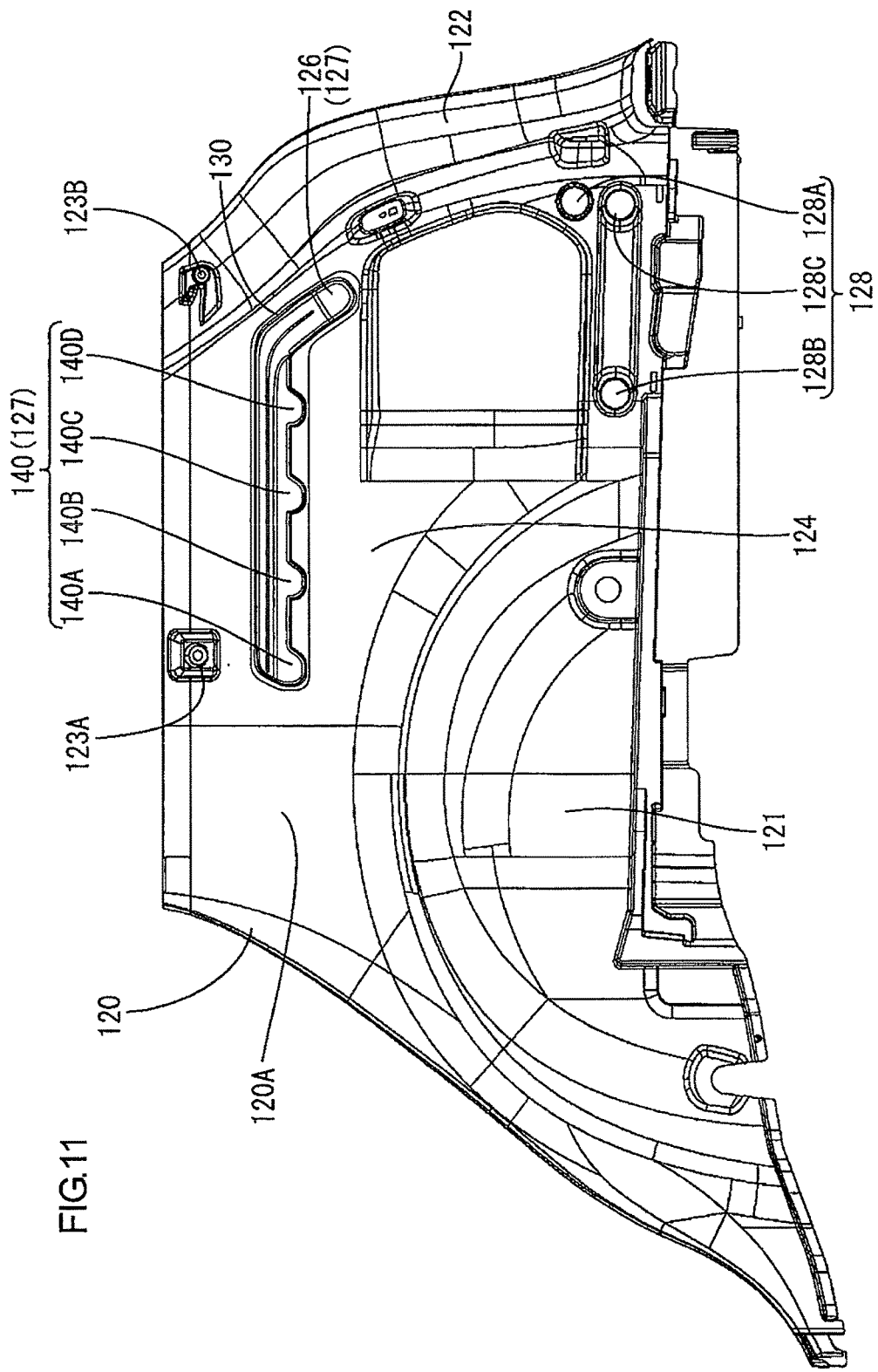
FIG. 11 is an elevational view of the cargo side-trim.

As illustrated in FIGS. 9 and 10, the vehicle 110 includes a rear cargo area 111 (a vehicle cargo area). The rear cargo area 111 is accessible through a rear opening 12 of the vehicle 110. Rear seats 113 that include rear surfaces 13A that face the rear of the vehicle 110 are disposed in front of the rear cargo area 111. The vehicle 110 includes a tonneau cover 114. The tonneau cover 114 may be arranged in the horizontal position in an upper portion of the rear cargo area 111 and held with a first tonneau cover holder 123A and a second tonneau cover holder 123B (see FIG. 12), which will be described later. The rear cargo area 111 may be used without the tonneau cover 114 for certain layouts.

Sides of the rear cargo area 111 are defined by right and left cargo side-trims, one of which is a cargo side-trim 120 illustrated in FIG. 9. As illustrated in FIG. 9, the bottom and the front of the rear cargo area 111 are defined by a floor surface 115A of a cargo floor board 115 and the rear surfaces 13A of the rear seats 113. In FIG. 9, the left cargo side-trim on the left side of the vehicle 110 is omitted and the cargo side-trim 120 on the right side of the vehicle 110 is illustrated in a simplified form. The cargo floor board 115 is formed in a flat shape and arranged in the horizontal position. Baggage may be placed on the floor surface 115A of the cargo floor board 115. Under the cargo floor board 115, an underfloor storage is provided. The floor board 115 may include a single part or multiple parts.

As illustrated in FIG. 9, the cargo side-trim 120 is a board disposed parallel to the vertical direction and in the front-rear direction of the vehicle 110. The cargo side-trim 120 has an interior surface 120A that is opposed to an interior surface of the left cargo side-trim in the width direction of the vehicle 110 so as to face the space of the rear cargo area 111. The cargo side-trim 120 may be referred to as a trunk side-trim or a luggage side-trim. The cargo side-trim 120 and the left cargo side-trim are symmetric, that is, the left cargo side-trim has a configuration similar to the cargo side-trim 120. Therefore, in the following description, only the cargo side-trim 120 on the right (on the upper side in FIG. 9) will be described in detail and the left cargo side-trim on the left (on the lower side in FIG. 9) will not be described in detail.

As illustrated in FIG. 11, the cargo side-trim 120 includes a wheel housing portion 121 at a lower front portion thereof. The wheel housing portion 121 is formed in a shape along a wheel housing. The cargo side-trim 120 includes a rear end portion 122 that is formed along an edge of the rear opening 112. The cargo side-trim 120 includes the tonneau cover holder 123A above the wheel housing portion 122 and the second tonneau cover holder 123B above the rear end portion 122. The first tonneau cover holder 123A and the second tonneau cover holder 123B receive fitting portions of the tonneau cover 114 (not illustrated). With the configuration, the tonneau cover 114 can be stretched along upper edges of the cargo side-trim 120 (see FIG. 2).

The left cargo side-trim includes a wheel hosing portion 121 and a rear end portion 122 formed in the same shapes as those of the cargo side-trim 120 described above, respectively. The cargo side-trim 120 includes a flat portion 124. The flat portion 124 is a portion that does not include the wheel housing portion 121 and the rear end portion 122. The cargo side-trim 120 and the left cargo side-trim are disposed such that the wheel housing portion 121 and the wheel hosing portion of the left cargo side-trim are parallel to each other and the flat portion 124 and the flat portion of the left cargo side-trim are parallel to each other. The cargo side-trim 120 and the left cargo side-trim 120 have configurations for holding a first rod 50A and a second rod 50B, which will be described later, such that the first rod 50A and the second rod 50B bridge between the cargo side-trim 120 and the left cargo side-trim. The configuration of the cargo side-trim 120 will be described later.

As illustrated in FIGS. 9 and 10, the divider 50 is installed in the cargo area 111. When the divider 50 is installed in the rear cargo area 111, the first rod 50A and the second rod 50B are parallel to each other such that the divider 50 is symmetric about an axis of symmetry along the width direction of the vehicle 110. The first rod 50A is in the front and the second rod 50B is in the rear when the end portions 52 thereof are held with a rail-side securing portion 127 and a rail-side securing portion of the left cargo side-trim. The first rod 50A can be held with the rail-side securing portion 127 and the rail-side securing portion of the left cargo side-trim and the second rod 50B can be held with a lower securing portion 128 and a lower securing portion of the left cargo side-trim. The rail-side securing portion 127 and the lower securing portion 128 will be described later.

Figure 13:
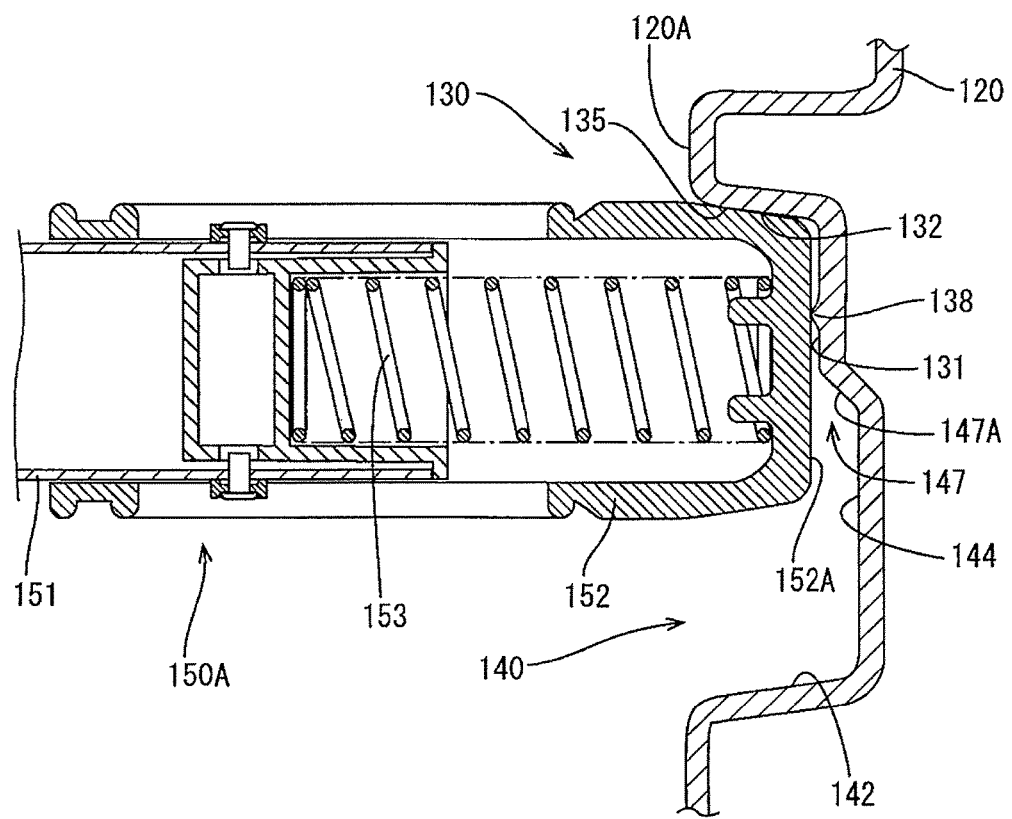
FIG. 13 is a cross-sectional view of the rail along line XIII-XIII in FIG. 12 and the rod.

As illustrated in FIGS. 9 and 10, the first rod 50A having a longitudinal shape is placed with the longitudinal direction thereof aligned with the width direction of the vehicle 110 and with tension applied in the directions toward the outer sides of the vehicle 110. In this condition, the first rod 50A is secured to the cargo side-trim 120 and the left cargo side-trim. The second rod 50B is secured to the cargo side-trim 120 and the left cargo side-trim in the same manner. The first rod 50A and the second rod 50B are can be compressed to shorten their length. As illustrated in FIG. 13, the first rod 50A includes a pipe portion 51 and end portions 52 located at ends of the pipe portion 51, respectively. The first rod 50A further includes springs 53 disposed inside the end portions 52, respectively. When first rod 50A is placed between the cargo side-trim 120 and the left cargo side-trim, the springs 53 of the first rod 50A are compressed between the pipe portion 51 and the cargo side-trim 120 and the left cargo side-trim. Tensions are applied to the end portions 52 in directions opposite to the pipe portion 51. Namely, a distance between each end of the pipe portion 51 and an end surface 52A of the end portion 52 at the end of the pipe portion 51 is variable (see FIGS. 13 and 14). Such a tension mechanism of the first rod 50A at each end portion 52 allows the first rod 50A to smoothly change its length in accordance with changing positions of the end portions 52 of the first rod 50A, which will be described later.

As illustrated in FIGS. 9 and 10, each end portion 52 of the first rod 50A has a cylindrical shape with the end surface 52A having a circular shape. The first rod 50A is placed such that the end surfaces 52A are parallel to a plane that is along the vertical direction and the front-rear direction of the vehicle 110. The first rod 50A is rotatable about a long axis thereof and along the cargo side-trim 120 and can be secured to several positions of the cargo side-trim 120 and the left cargo side-trim. The first rod 50A and the second rod 50B are connected by the net 55. The first rod 50A and the second rod 50B can be independently moved within reach of the net 55.

As illustrated in FIG. 11, the cargo side-trim 120 includes a rail 100. The rail 100 includes a guide rail portion 130, a rail-side securing portion 127, and a lower securing portion 128. The guide rail portion 130 is for guiding at least the end portion 52 of the first rod 50A in the front-rear direction of the vehicle 110. The rail-side securing portion 127 includes at least a front securing portion 140 and a rear securing portion 126. The front securing portion 140 includes the first front holder 140A, a second front holder 140B, a third front holder 140C, a fourth front holder 140D, and a stopper 147. The rear securing portion 126 includes a holder 126B and a rear boundary protrusion 126A. The first front holder 140A, the second front holder 140B, the third front holder 140C, the fourth front holder 140D, and the rear holder 126B communicate with the guide rail portion 130, respectively. The rail-side securing portion 127 is for securing the end portion 52 of the first rod 50A. The lower securing portion 128 is located at a position lower than the rail-side securing portion 127. The lower securing portion 128 is for securing the end portion 52 of the second rod 50B.

The guide rail portion 130, the first to the fourth front holders 140A to 140D of the rail-side securing portion 127, and a first, a second, and a third lower holders 128A, 128B and 128C of the lower securing portion 128 included in the cargo side-trim 120 are recessed from an interior surface 120A of the cargo side-trim 120. The guide rail portion 130, the rail-side securing portion 127, and the lower securing portion 128 are formed during the molding of the cargo side-trim 120. In comparison to a process in which a slide rail and securing members are prepared separately from a cargo side-trim and mounted to the cargo side-trim, the number of parts and the number of steps are reduced.

Figure 12:
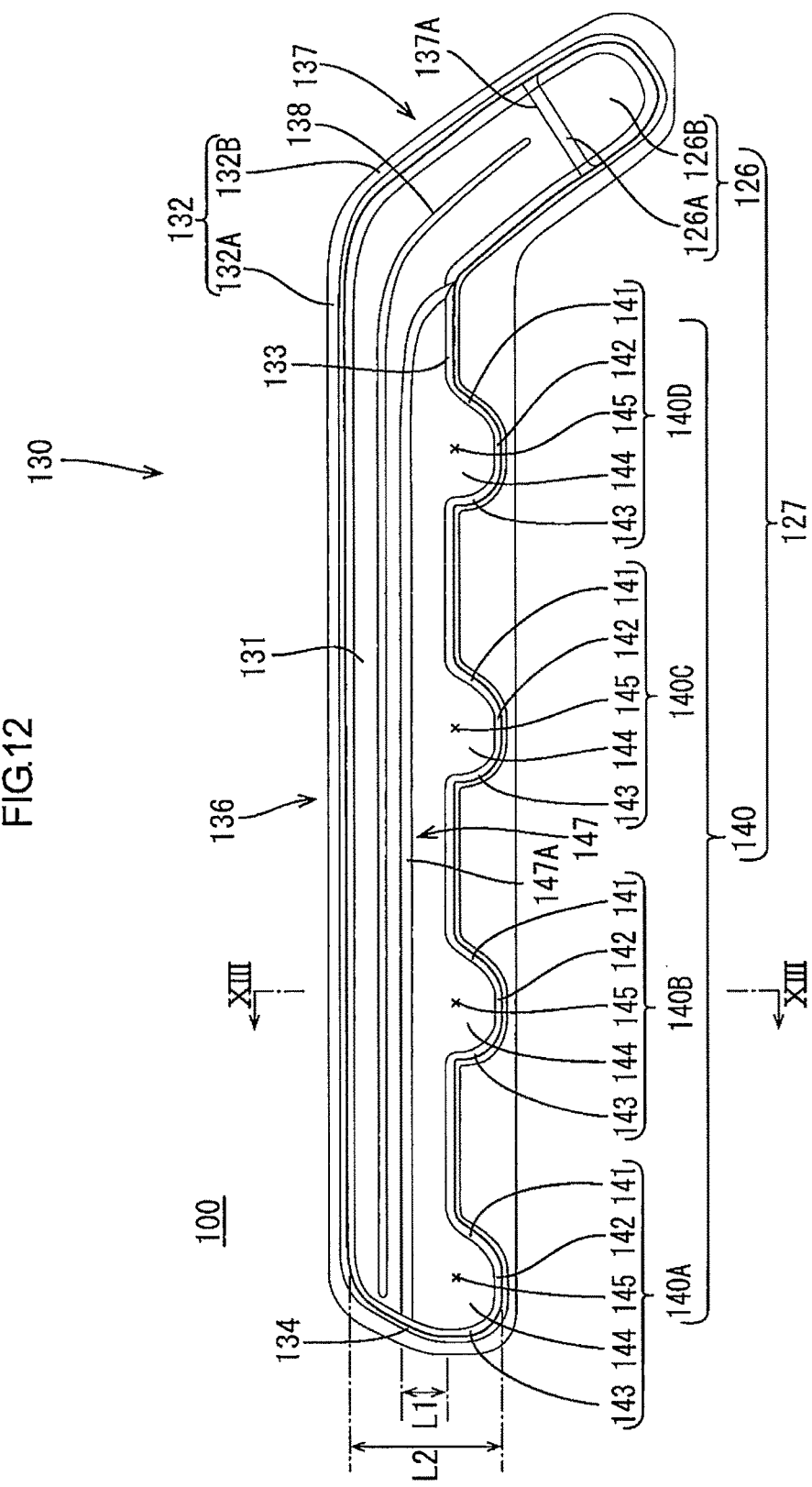
FIG. 12 is a magnified view of a rail included in the cargo side-trim.

As illustrated in FIGS. 12 and 13, the guide rail portion 130 includes a groove that extends in the front-rear direction of the vehicle 110. The groove is recessed toward the outer side of the vehicle 110 in the width direction of the vehicle 110. The rail 100 includes a first sidewall 131, a top wall 132, a first bottom wall 133, a sloped front wall 134, sloped walls 141, second bottom walls 142, vertical front walls 143, and second sidewalls 144. The groove of the guide rail portion 130 is defined by the first sidewall 131, the top wall 132, the first bottom wall 133, and the sloped front wall 134. An opening 135 of the groove is in an area of the interior surface 120A between the top wall 132 and the first bottom wall 133. The first sidewall 131 is located more to the outside of the vehicle 110 than the interior surface 120A. The top wall 132 extends from the upper edge of the first sidewall 131 to the interior surface 120A. The first bottom wall 133 extends from the lower edge of the first sidewall 131 to the interior surface 120A. The interior surface 120A, the top wall 132, and the first sidewall 131 form a step. The interior surface 120A, the first bottom wall 133, and the first sidewall 131 form a step. A width of the groove of the guide rail portion 130 (an inner dimension between the top wall 132 and the first bottom wall 133) is defined such that the end portion 52 of the first rod 50A can be placed therein with a clearance. An entire length of a hollow of the guide rail portion 130 between the top wall 132 and the bottom wall 133 is a passage of the end portion 52 of the first rod 50A.

As illustrated in FIG. 12, the guide rail portion 130 includes a horizontal portion 136 and an extending portion 137. The horizontal portion 136 extends in the horizontal direction. The extending portion 137 extends from a rear end of the horizontal portion 136 and curves downwards. The extending portion 137 communicates with the horizontal portion 136. The extending portion 137 is for guiding the end portion 52 of the first rod 50A between the horizontal portion 136 and the rear securing portion 126.

The top wall 132 includes a horizontal wall portion 132A and a sloped wall portion 132B. The bottom wall 133 includes voids, a horizontal wall portion 133B, and a sloped wall portion 133C. The horizontal portion 136 is defined at least by the horizontal wall portion 132A of the top wall 132 and the horizontal wall portion 133B of the bottom wall 133. The extending portion 137 is defined at least by the sloped wall portion 132B of the top wall 132 and the sloped wall portion 133C of the bottom wall 133. The first front holder 140A, the second front holder 140B, the third front holder 140C, and the fourth front holder 140D are located lower than the sloped wall portions 133B of the bottom wall 133.

As illustrated in FIG. 12, the guide rail portion 130 is opened to the rear securing portion 126 at the rear end and closed at the front end. More specifically, the extending portion 137 includes a distal end 137A that opens to the rear securing portion 126 and the horizontal portion 36 includes the sloped front wall 134 that closes the groove of the guide rail portion 130 at the front. The sloped front wall 134 faces the sloped wall 141 of the first front holder 140A, which will be described later. The sloped front wall 134 is connected to the first front holder 140A. The sloped front wall 134 is for guiding the end portion 52 of the first rod 50A between the guide rail portion 130 and the first front holder 140A. According to the configuration, the end portion 52 of the first rod 50A is easily inserted into or pulled out of the first front holder 140A even though the first front holder 140A that is located adjacent to a rear surface 113A of a rear seat 113 is far from the rear opening 112.

As illustrated in FIGS. 12 and 13, the guide rail portion 130 includes a linear protrusion 138 (a rail-side bead) which protrudes from the first sidewall 131 and extends in the longitudinal direction of the guide rail portion 130. The linear protrusion 138 has a convex shape with an arched outline that curves toward the vehicle interior side in a cross section cut along the width direction of the vehicle 110. A ridge of the linear protrusion 138 is a contact surface that is in contact with the end surface 52A of the first rod 50A. In comparison to a configuration in which a contact surface that is in contact with the end surface 52A of the first rod 50A is a flat surface instead of a ridge, a contact area between the guide rail portion 130 and the end surface 52 is smaller and thus a frictional resistance therebetween is smaller. The linear protrusion 138 is located slightly above a centerline of the guide rail portion 130 along the horizontal direction and above the stopper 147, which will be described later.

The left cargo side-trim includes a slide rail having the same configuration as the guide rail portion 130. The end portions 52 of the first rod 50A are inserted into the guide rail portion 130 through the opening 135 and the side rail of the left cargo side-trim through the opening, respectively. The guide rail portion 130 and the side rail of the left cargo side-trim are located at positions slightly lower than shoulders of a user who has an average height and stands behind the rear opening 112 of the vehicle 110 so that user can easily slide the end portions 52 along the top wall 132 and the top wall of the left cargo side-trim to move the first rod 50A in the front-rear direction of the vehicle 110. The first front holder 140A, the second front holder 140B, the third front holder 140C, and the fourth front holder 140D are connected to the lower side of the guide rail portion 130. The first front holder 140A, the second front holder 140B, the third front holder 140C, and the fourth front holder 140D are concave portions that communicate with the horizontal portion 136.

Figure 14:
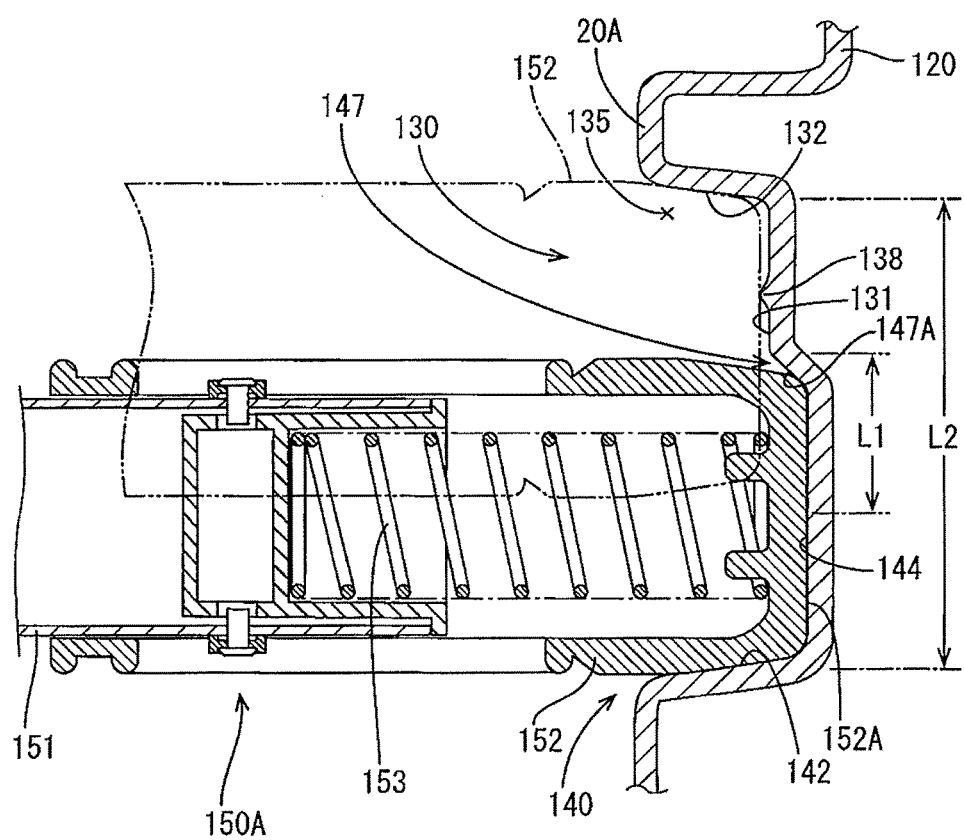
FIG. 14 is a cross-sectional view of the rail along line XIII-XIII in FIG. 12 and the rod.

As illustrated in FIGS. 12 and 14, the first to the fourth front holders 140A to 140D are arranged below the horizontal portion 136 of the guide rail portion 130 so as to communicate with the guide rail portion 130. the first to the fourth front holders 140A to 140D are for holding the end portion 52 of the first rod 50A therein. The first front holder 140A, the second front holder 140B, the third front holder 140C, and the fourth front holder 140D are arranged along the longitudinal direction of the guide rail portion 130 (or the horizontal portion 36 of the guide rail portion 130). The first front holder 140A, the second front holder 140B, the third front holder 140C, and the fourth front holder 140D are arranged at equal intervals between the front end and the rear end of the guide rail portion 130. The first rod 50A is held by the first front holder 140A and the first front holder of the left cargo side-trim, the second front holder 140B and the second front holder of the left cargo side-trim, the third front holder 140C and the third front holder of the left cargo side-trim, or the fourth front holder 140D and the fourth front holder of the left cargo side-trim, that is, any one of pairs selected by the user.

As illustrated in FIGS. 12 and 14, a lower portion of the first sidewall 131 is located on the outer side of the vehicle 110 than an upper portion of the first sidewall 131. The stopper 147 is a portion of the first sidewall 131 between the upper portion and the lower portion. Namely, an upper end of the stopper 147 is connected to a lower end of the upper portion and a lower end of the stopper 147 is connected to an upper end of the lower portion and thus the stopper 147 is sloped from the lower end of the upper portion to the upper end of the lower portion. The front securing portion 140 includes the sloped walls 141, the second bottom walls 142, the vertical front walls 143, and the second sidewalls 144. The sloped walls 141 extend from the first bottom wall 133 and slope toward the lower front of the vehicle 110. The second bottom walls 142 are connected to lower ends of the respective sloped walls 141. The second bottom walls 142 are for holding the end portion 52 of the first rod 50A thereon. The vertical front walls 143 extend upward from front ends of the respective second bottom walls 142. The second sidewalls 144 extend upward from sides of the respective second bottom walls 142 on the outer side of the vehicle 110. The front securing portion 140 includes holding spaces 145, respectively. Each holding space 145 is defined by the stopper 147, the sloped wall 141, the second bottom wall 142, the vertical front wall 143, and the second sidewall 144. The holding spaces 145 are for holding the end portion 52 of the first rod 50A.

As illustrated in FIGS. 12 and 13, the upper end of the stopper 147 is located at about the middle of the vertical dimension of the first sidewall 131. The lower portion of the first sidewall 131 and the second sidewall 144 have dimensions measuring in the vertical direction such that a sum of the dimensions is about equal to the outer diameter of the end portion 52 of the first rod 50A. A dimension of the upper portion of the first sidewall 131 measuring in the vertical direction can be defined according to a desired size of an overlapping space between the horizontal portion 136 and the holding space 145. The dimension of the upper portion of the first sidewall 131 may be smaller than the outer diameter of the end portion 52. Specifically, the dimension of the upper portion of the first sidewall 131 may be in a range from $\frac{1}{2}$ of the outer diameter of the end portion 52 to $\frac{4}{5}$ of the outer diameter of the end portion 52 but not limited to the range.

In FIG. 14, the end portion 52 in the groove of the horizontal portion 136 is illustrated with a two-dashed chain line. As illustrated in FIG. 14, a vertical dimension of a portion of the horizontal portion 136 in which the end portion 52 in the groove of the horizontal portion 136 and the end portion 52 in the corresponding one of the first to the fourth front holders 140A to 140D overlap is defined as L1, which corresponds to a distance between the top surface of the first bottom wall 133 and the top of the stopper 147. A vertical dimension of the rail 100 between the top end of the horizontal portion 136 and the bottom end of the corresponding one of the first to the fourth front holders 140A to 140D is defined as L2. The stopper 147 is formed such that L1 is in a range from $\frac{1}{5}$ to $\frac{1}{2}$ of the outer diameter of the end portion 52. Although L2 can be decreased by increasing L1, if L1 is decreased, vertical dimensions of the second sidewall 144 and the sloped wall 141 decease. Therefore, the end portion 52 of the first rod 50A is more easily removed from the corresponding one of the first to the fourth front holders 140A to 140D and moved to the guide rail portion 130. In this embodiment, L1 is equal to or larger than ⅕ of the outer diameter of the end portion 52, namely, L2 is maintained small. Furthermore, L1 is equal to or smaller than ½ of the outer diameter of the end portion 52. Namely, the top end of the second sidewall 144 and the top end of the sloped wall 41 are located upper than the center axis of the end portion 52 of the first rod 50A that is placed in the corresponding one of the front holders 140A to 140D. According to the configuration, the end portion 52 of the first rod 50A is less likely to move in the front-rear direction of the vehicle 110 and into the guide rail portion 130.

Furthermore, because the horizontal portion 136 and the holding space 145 share a space of the rail 100, L2 can be reduced in comparison to a configuration in which a horizontal portion and a holding space do not share a space of a rail such as the embodiment described earlier. According to the configuration in which the dimension of the upper portion of the first sidewall 131 is in the range from ½ of the outer diameter of the end portion 52 to ⅘ of the outer diameter of the end portion 52, the end portion 52 of the first rod 50A is less likely to move in the front-rear direction of the vehicle 110 and into the guide rail portion 130 while the end portion 52 can be smoothly moved in the horizontal portion 136 that is provided in a size sufficient for the move of the end portion 52.

As illustrated in FIGS. 13 and 14, the stopper 147 is formed such that the upper portion of the first sidewall 131, the lower portion of the first sidewall 131, and the stopper 147 form a step. The stopper 147 includes a stopper sloped surface 147A that slopes from the upper end of the lower portion of the first sidewall 131 to the lower end of the upper portion of the first sidewall 131 toward the upper inner side of the vehicle 110.

As illustrated in FIG. 14, the stopper sloped surface 147A faces the lower interior side of the vehicle 110. The stopper sloped surface 147A press the end portion 52 of the first rod 50A from above when the end portion 52 is placed in the holding space 145 and in contact with the stopper sloped surface 147A. A slope angle of the stopper sloped surface 147A relative to the vertical direction is about 45 degrees. A height of the stopper sloped surface 147A from the first sidewall 131 measuring in the width direction of the vehicle 110 is smaller than the depth of the guide rail portion 130 (about ⅓ of the depth). The slope angle and the height of the stopper sloped surface 147A may be defined according to a desired load required for moving the end portion 52 of the first rod 50A from one of the first to the fourth front holders 140A to 140D to the guide rail portion 130.

As illustrated in FIG. 12, the stopper sloped surface 147A extends in the longitudinal direction of the horizontal portion 136 of the guide rail portion 130, that is, the front-rear direction of the vehicle 110. An angle between the stopper sloped surface and the direction parallel to the sloped wall 141 (i.e., a direction toward the upper rear of the vehicle 110) is smaller than an angle between the stopper sloped surface 147A and the vertical direction. According to the configuration, a load applied to the stopper sloped surface 147A by the end portion 52 of the first rod 50A that moves toward the upper rear of the vehicle 110 when the user accesses to the rear cargo area 111 through the rear opening 12 and pulls the first rod 50A is smaller than a load applied to the stopper sloped surface 147A by the end portion 52 of the first rod 50A that moves upward. Therefore, the end portion 52 is easily moved from the one of the first to the fourth front holders 140A to 140D to the guide rail portion 130 along the sloped wall 141.

As illustrated in FIG. 12, the sloped wall 141 extend from the bottom wall 133 toward the front rear of the vehicle 110. A junction between each sloped wall 141 and the guide rail portion 130 is located at a rear end of corresponding one of the front holders 140A to 140D. According to the configuration, the user can easily insert the end portion 52 of the first rod 50A into one of the first to the fourth front holders 140A to 140D when the user access the rear cargo area 111 through the rear opening 112. The slope angle of each sloped wall 141 relative to the front-rear direction of the vehicle 110, that is, the longitudinal direction of the guide rail portion 30 (or the bottom wall 133) is about 45 degrees.

As illustrated in FIG. 12, the second bottom walls 142 extend from the lower ends of the respective sloped walls 141 in the horizontal direction toward the front of the vehicle 110. A length of each second bottom wall 142 measuring in the horizontal direction is about equal to the outer diameter of the end portion 52 of the first rod 50A. The second sidewalls 144 are located outer than the upper portion of the first sidewall 31 (above the stopper 147). In comparison to the configuration in which the second sidewalls 144 are on the same plane as the upper portion of the first sidewall 131, the second bottom walls 142 have a larger width. Therefore, the second bottom walls 142 can stably hold the end portion 52 of the first rod 50A.

As illustrated in FIG. 12, the rear securing portion 126 is located lower than the front securing portion 140 and connected to the distal end 137A of the extending portion 137. The rear securing portion 126 is for securing the end portion 52 of the first rod 50A. The rear holder 126B is recessed toward the exterior side of the vehicle 110 in a shape along the outline of the end portion 52 of the first rod 50A. The rear securing portion 126 includes inner surfaces that are linearly connected to a surface of the first bottom wall 133 and a surface of the top wall 132. More specifically, the inner surfaces of the rear securing portion 126 are connected to an inner surface of the sloped wall portion 132B of the top wall 132 of the extending portion 137 and an inner surface of the sloped wall portion 133C of the first bottom wall 133 of the extending portion 137. The rear securing portion 126 includes the rear boundary protrusion 126A that defines a boundary between the rear securing portion 126 and the guide rail portion 130. The rear boundary protrusion 126A protrudes from the first sidewall 131 and extends so as to close the distal end 137A of the extending portion 137. The rear boundary protrusion 126A includes a first surface that faces the guide rail portion 130 and a second surface that faces the rear holder 126B. The first surface and the second surface project from the first sidewall 131 at the same angle toward the inner side of the vehicle 110. The angle of the first surface is defined according to a desired load required for moving the end portion 52 of the first rod 50A from the guide rail portion 130 to the rear securing portion 126. The angle of the second surface is defined according to a desired load required for moving the end portion 52 of the first rod from the rear securing portion 126 to the guide rail portion 130.

As illustrated in FIG. 12, the cargo side-trim 120 includes a rear end portion 122 that is curved toward the front of the vehicle 110 such that the upper edge of the rear end portion 122 is more to the front of the vehicle 110 than the lower edge of the rear end portion 122. In comparison to a configuration in which the rear securing portion 126 is arranged at the same vertical position as the front securing portion 140, the rear securing portion 126 can be arranged more to the rear by setting the vertical position of the rear securing portion 126 lower than the front securing portion 140. The rear end portion 122 of the cargo side-trim 120 includes a tonneau cover holder 123B. The rear securing portion 126 is arranged below the tonneau cover holding portion 123B.

As described earlier, the rail-side securing portion 127 includes the front securing portion 140 and the rear securing portion 126. The lower securing portion 128 is arranged at the lower end portion of the cargo side-trim 120 and more to the rear than a wheel housing 121.

As illustrated in FIG. 12, the lower securing portion 128 includes a first lower holder 128A, a second lower holder 128B, and a third lower holder 128C. The first lower holder 128A is arranged on an upper side and the second lower holder 128B and the third lower holder 128C are arranged on a lower side. The second lower holder 128B and the third lower holder 28C are separated from each other in the front-rear direction of the vehicle 110. The first lower holder 128A has a round shape in a plan view and a depth in the width direction of the vehicle 110. An overall shape of the first lower holder 128A is along the end portion 52 of the second rod 50B. The second lower holder 128B and the third lower holder 128C have shaped along the end portion 52 of the second rod 50B with depths in the width direction of the vehicle 110. The lower securing portion 128 includes a lower guide rail that has a depth smaller than the depths of the second lower holder 128B and the third lower holder 128C. The lower guide rail is connected between the second lower holder 128B and the third lower holder 128C.

The end portion 52 of the first rod 50A can be held in one of the first to the fourth front holders 140A to 140D of the rail-side securing portion 127 and the second rod 50B can be held in another one of the second to the fourth front holders 140B to 140D or the rear holder 126B for a horizontal arrangement of the divider 50. The first rod 50A can be held in one of the first to the fourth front holder 140A to 140D and the rear holder 126B and the second rod 50B can be held in one of the lower holders 128A, 128B, and 128C of the lower securing portion 128 for a vertical arrangement of the divider 50.

Changing a layout of the rear cargo area 111 by holding the first rod 50A and the second rod 50B with different holders 140A to 140D, the rear holder 126B, or one of the lower holders 128A to 128C will be described. In a first example, how the first rod 50A is held in the second front holder 140B and then moved from the second front holder 140B to the guide rail portion 130 and released will be described. How to insert the first rod 50A to other holders 140 to 140D or the rear holder 126B is similar to how to secure the first rod 50A to the second front holder 140B and thus will not be described.

To insert the first rod 50A into the second front holder 140B, the end portion 52 of the first rod 50A is inserted into the guide rail portion 130 and then slid in the horizontal direction toward the second front holder 140B. The direction of sliding the end portion 52 is changed from the horizontal direction to a downward direction toward the lower front of the vehicle 110 to insert the end portion 52 into the second front holder 140B along the sloped wall 141. The first rod 50A extends as a pushing force applied to the end portion 52 by the stopper-side sloped surface 47A that is sloped from a top of the stopper 147 toward the outer side of the vehicle 110 decreases until the end portion 52 is held at a position between the second front holder 140B and the stopper 147, more specifically, until the end portion 52 is placed on the second bottom wall 142. The other end portion 52 of the first rod 50A is held at a position between the second front holder and the stopper of the left cargo side-trim, that is, on the second bottom wall in the same manner. The position at which the end portion is held is defined such that a space in which ⅓ of the end portion 52 on the upper side is located overlap a space of the guide rail portion 130 in which the end portion 52 is located at the end of the sliding. While the end portions 52 are placed on the second bottom wall 142 and the other second bottom wall, respectively, the end portions 52 are pressed against the second sidewall 144 and the second sidewall of the left cargo side-trim, respectively. The first rod 50A is positioned relative to the front-rear direction, the top to bottom direction, and the width direction of the vehicle 110, namely, the first rod 50A is restricted from moving to those directions. When the end portions 52 are placed on the second bottom wall 142 and the second bottom wall of the left cargo side-trim, respectively, the end portions 52 are held in the second front holder 40B and the second front holder of the left cargo side-trim, respectively, and the first rod 50A is secured to the cargo side-trim 120 and the left cargo side-trim.

To release the first rod 50A, the first rod 50A is pulled toward the upper rear of the vehicle 110 and slid toward the guide rail portion 130 along the sloped wall 141. During the sliding of the first rod 50A, the end portion 52 is pulled out of the second front holder 140B and the other end portion is pulled out of the other second front holder. During the pulling the end portion 52 out of the second front holder 140B, the end portion 52 is pushed by the stopper-side sloped surface 47A and thus the first rod 50A is compressed. The end portion 52 passes over the stopper 47. When the first rod 50A is further pulled until the end portion 52 contacts the top wall 132, the end portion 52 moves into the guide rail portion 130. When the end portion 52 reaches the guide rail portion 130, the end portion 52 is released from the second front holder 140B. The other end portion of the first rod 50A is released from the other second front holder in the same manner.

According to the configuration described above, it is not necessary to remove the first rod 50A from the guide rail portion 130 or the rail-side securing portion 127 to move the end portion 52 from one of the front holders 140A to 140D and the rear holder 126B to another one of those. If securing or releasing of the first rod 50A requires pressing of the end portion 52 by a hand to compress the first rod 50A until the end portion 52 is placed inner of the rear cargo area 111 than the interior surface 120A of the cargo side-trim 120, the securing or the releasing of the first rod 50A is more complicated. According to the configuration described above, such complicated work is not required for securing or releasing the first rod 50A. Furthermore, precise positioning of the end portion 52 relative to the holding space 145 of the rail-side securing portion 127 is not required for securing the first rod 50A to the first securing portion 40 because the end portion 52 is guided by the guide rail portion 30 or the sloped wall 141.

Next, the layout of the rear cargo area 111 with the divider 50 in the horizontal arrangement and the layout of the rear cargo area 111 with the divider 50 in the vertical arrangement will be described.

First, the layout of the rear cargo area 111 with the divider 50 in the horizontal arrangement illustrated in FIG. 9 will be described. As illustrated in FIG. 9, the end portion 52 of the first rod 50A is tightly placed in the first front holder 140A and the end portion 52 of the second rod 50B is tightly placed in the fourth front holder 140D. The end portions 52 of the first rod 50A and the second rod 50B are tightly placed in the first front holder 140A and the fourth front holder 140D, respectively, as described earlier. The net 55 droops due to its weight, that is, the net 55 is in a form of a hammock. With the divider 50 in the horizontal arrangement, the rear cargo area 111 is divided into an upper cargo area and a lower cargo area. The upper cargo area is above the divider 50 and the lower cargo area is between the floor surface 115A of the cargo floor board 115 and the divider 50. Although an upper space of the rear cargo area 11 tends to be a dead space, the upper space can be effectively used with the divider 50.

The second rod 50B may be held with the rear securing portion 126 and the other rear securing portion. An arrangement of the divider 50 with the end portion 52 of the second rod 50B tightly placed in the rear holder 126B and the rear holder of the left cargo side-trim may be referred to as the horizontal arrangement. As illustrated in FIG. 12, the rear holder 126B is located below the second tonneau cover holder 123B. According to the configuration, a space is provided between a rear end portion of the tonneau cover 114 and the second rod 50B in a size sufficient for inserting a hand of the user or a small object. Namely, the user can easily place an object on the net 55 or remove from the net 55 with the tonneau cover 114 placed in the rear cargo area 111.

In the horizontal arrangement, a dimension of the divider 50 in the front-rear direction of the vehicle 110 or a depth of the net 55, that is, division of the rear cargo area 111 in the horizontal direction can be altered by changing the securing positions of the first rod 50A and the second rod 50B. The rail-side securing portion 127 in this embodiment includes the holders 140A to 140D and the rear holder 126B. The layout of the rear cargo area 11 can be changed by selecting any two of the holders 140A to 140D and the rear holder 126B and holding the first rod 50A and the second rod 50B with the two of the holders 140A to 140D and the rear holder 126B. According to the configuration, flexibility in layout of the rear cargo area 111 is provided.

Next, the layout of the rear cargo area 111 with the divider 50 in the vertical arrangement illustrated in FIG. 2 will be described. As illustrated in FIG. 10, the first rod 50A is held with the rear holder 126B and the second rod 50B is held with the third lower holder 128C. The first rod 50A and the second rod 50B are held with the rear holder 126B and the third lower holder 128C, respectively, as described earlier. If the end portion 52 of the second rod 50B is in the second lower holder 128B, the second rod 50B is moved from the second lower holder 128B to the third lower holder 128C along the lower guide rail. If the end portion 52 of the second rod 50B is not in the second lower holder 128B, the end portion 52 of the second rod 50B is held in the third lower holder 128C. The other end portion 52 of the second rod 50B is pressed and the second rod 50B is compressed. The other end portion 52 of the second rod 50B is held in the other third lower holder 128C. Alternatively, the other end portion 52 of the second rod 50B may be held in the other third lower holder first, the end portion 52 is pressed to shrink the second rod 50B, and the end portion 52 is held in the third lower holder 128C. The net 55 is hung from the first rod 50A so as to extend in the vertical direction and the width direction of the vehicle 110. Namely, a lower portion of the rear opening 112 of the rear cargo area 111 is closed with the net 55 and thus an object placed on the floor surface 115A of the cargo floor board 115 is less likely to drop out of the rear cargo area 111 through the rear opening 112.

When the divider 50 is placed in the vertical position with the second rod 50B held with the lower securing portion 128, the rear cargo area 111 is divided into a front area and a rear area. If a large object is placed under the cargo floor board 115, for example, if a full-sized spare tire that is larger than a space-saver spare tire is placed under the cargo floor board 115, the second lower holder 128B and the third lower holder 128C may not be used. Even in such a case, the end portion 52 of the second rod 50B can be tightly placed in the first lower holder 128A.

For the vertical arrangement of the divider 50, the first rod 50A is held with one of the holders 140A to 140D and the rear holder 126B of the rail-side securing portion 127 and the second rod 50B is held with one of the holders 128A to 128C of the lower securing portion 128 are selected. With the divider 50, the rail-side securing portion 127, and the lower securing portion 128, the layout of the rear cargo area 111 can be changed in various ways. The net 55 may have a width that is not sufficient for holding the second rod 50B with the third lower holder 128C when the first rod 50A is held with the first front securing portion 40A.

Next, functions and effects of this embodiment will be described.

The guide rail portion 130 and the front securing portion 140 of this embodiment are configured such that a portion of the end portion 52 of the first rod 50A that extends as the end portion 52 moves from the guide rail portion 130 to the front securing portion 140 is in an area of the guide rail portion 130 when the end portion 52 is placed in one of the front holders 140A to 140D. Namely, the holding spaces of the rail 100 and the guide rail portion 130 share spaces of the rail 100. According to the configuration, the end portion 52 of the first rod 50A is held with the stopper 147 and one of the first to the fourth front holders 140A to 140D and thus the end portion 52 is less likely to be removed from the one of the first to the fourth holders 140A to 140D to the guide rail portion 130. Furthermore, in comparison to a configuration in which a holding space for holding the end portion 52 of the first rod 50A and a rail guide portion for guiding the end portion 52 do not share the space of a rail, length L2 can be reduced. Therefore, the first to the fourth front holders 140A to 140D can be arranged in a limited space of the rear cargo area 111 and thus the securing positions of the divider 50 can be altered for different layouts.

The guide rail portion 130 includes the linear protrusion 138 that protrudes from the first sidewall 131 and has the longitudinal dimension in the direction in which the horizontal portion 136 of the guide rail portion 130 extends. The end surface 52 of the first rod 50A can slide on the linear protrusion 138. In comparison to a configuration in which the end surface 52A slides on the first sidewall 131, the contact area between the end surface 52A and the guide rail portion 130 can be reduced and thus the friction between the end surface 52A and the guide rail portion 130 during sliding of the end portion 52 is reduced.

The stopper 147 includes the stopper sloped surface 147A that slopes down toward the outside of the vehicle 110. The slope angle of the stopper sloped surface 147A can be defined according to a desired load required for moving the end portion 52 from the front securing portion 140 to the guide rail portion 130.

Other Embodiments

The technology described herein is not limited to the embodiment described in the above description and the drawings. The technology described herein may include the following embodiments. Furthermore, the configuration of the above embodiment may be altered within the scope of the present invention.

(1) The shape of the rear securing portion is not limited to those in the above embodiments. The rear securing portion may be curved downward from the distal end of the extending portion of the guide rail portion.

(2) The shape and the position of the rear securing portion may be altered from those in the above embodiments as appropriate.

(3) The number of holders included in the front securing portion is not limited to four as long as the front securing portion includes at least one holder.

(4) The front securing portion may be configured such that a portion thereof is at a position that overlaps the horizontal portion of the rail. Alternatively, the front securing portion may be at a portion that overlaps the horizontal portion entirely.

(5) The shape of the front securing portion is not limited to those in the above embodiments. The sloped surfaces of the front securing portion may be sloped toward the lower rear of the vehicle. The stoppers of the front securing portion may be formed by denting the second sidewall toward the outer side of the vehicle than the first sidewall to form a step.

(6) The shape, the positions, and the number of the front holders are not limited to those in the above embodiment.

(7) The rail-side securing portion may be configured differently from the above embodiments. The rail-side securing portion may include holders arranged above the guide rail portion and connected to the guide rail portion.

(8) The cargo side-trims may not include the lower securing portions.

(9) The shapes, the positions, and the number of the lower holders are not limited to those in the above embodiments.

(10) The guide rail portion may not include the extending portion. The cargo side-trim may not include either one of the rear securing portion and the lower securing portion.

(11) The sloped walls of the front securing portion are not limited to the configurations that the sloped walls are sloped toward the lower front of the vehicle. The sloped walls may be sloped toward the lower rear of the vehicle.

(12) The second horizontal walls may be curved along the peripheral surface of the end portion of the rod.

(13) The stoppers may be protrusions that protrude from the second sidewalls, respectively, without connecting to other walls of the holders.

(14) The protrusions on the horizontal walls may be formed by connecting different parts having friction coefficient high than that of the interior surface of the cargo side-trim to the horizontal walls.

(15) The slope angles of the sloped surfaces of the rear securing portion boundary may be defined differently from each other. The second sidewalls may be formed outer than the first sidewall and the dimension of the securing portion-side sloped wall may be defined larger than the rail-side sloped wall.

(16) The stopper sloped surface may be configured such that a clearance is provided between the stopper sloped surface and the end portion of the rod and the end portion is brought into contact with the stopper sloped surface when the rod is moved upward.

(17) The stopper sloped surface may be formed along an outer peripheral surface of the end portion of the rod. Furthermore, stopper sloped surfaces may be formed for the front holders, respectively.

(18) The front wall may be sloped from the front end of the horizontal wall toward the upper front of the vehicle such that the front wall is line symmetric to the sloped wall.

(19) The position, the shape, and the number of the line protrusion are not limited to those in the above embodiment.

(20) A mechanism of extension and compression of the rod is not limited to the one using the spring.

The invention claimed is:

1. A layout system for a cargo area of a vehicle, the system comprising:
    a divider comprising: a first rod, a second rod, and a screen having flexibility and being hung between the first rod and the second rod; and
    a pair of cargo side-trims installed in the vehicle to form sidewalls of the cargo area comprising rails, the rails comprising:
        guide rail portions for guiding end portions of the first and the second rods at least along a font-rear direction of the vehicle, the guide rail portions including horizontal portions and extending portions extending from the respective horizontal portions toward a lower rear of the vehicle;
        rail-side securing portions connected to the guide rail portions, respectively, the rail-side securing portions for holding the end portions of the first and the second rods to secure the first and the second rods to the cargo side-trims.

2. The layout system according to claim 1, wherein the rail-side securing portions comprising:
    front securing portions connected to the horizontal portions, respectively, the front securing portions for holding the end portions of the first rod and the second rod for securing the first rod and the second rod to the cargo side-trims; and
    rear securing portions connected to the extending portions, respectively, the rear securing portions for holding the end portions of the first rod and the second rod for securing the first rod and the second rod to the cargo side-trims.

3. The layout system according to claim 2, wherein
    the cargo side-trims further comprising lower securing portions, respectively,
    the lower securing portions are for holding at least the end portions of the second rod for securing at least the second rod to the cargo side-trims,
    at least the front securing portions comprises multiple holders, respectively,
    the holders are for holding the end portions of the first and the second rods for holding the divider in a horizontal position, and
    the lower securing portions are for holding the end portions of the second rod, respectively, while the end portions of the first rod is held with the rail-side securing portions for holding the divider in a vertical position.

4. The layout system according to claim 3, wherein
    the rails further comprise stoppers for restricting the end portions of the first and the second rods from moving out of the holders, and
    the stoppers are located above the holders.

5. The layout system according to claim 4, wherein
    each of the holders includes a sloped wall and a bottom wall,
    the sloped wall is connected to the corresponding guide rail portion and sloped relative to the front-rear direction of the vehicle, the bottom wall is connected to a lower end of the sloped wall and includes a surface for holding one of the end portions of the first and the second rods thereon, and at least one of the stoppers is arranged opposite the sloped wall.

6. The layout system according to claim 5, wherein each of the holders includes a front wall that extends upward from a front edge of the bottom wall, and the at least one of the stoppers projects from an upper end of the front wall toward the sloped wall.

7. The layout system according to claim 5, further comprising a protrusion formed on the surface of the bottom wall adjacent to the lower end of the sloped wall.

8. The layout system according to claim 3, wherein the cargo side-trims include flat portions, the guide rail portions include sidewalls, top walls, bottom walls, and front walls, the sidewalls, the top walls, and the bottom walls of the guide rail portions extend in the front-rear direction of the vehicle, the top walls and the bottom walls of the guide rail portions project from the flat portions toward an outer side of the vehicle and the sidewalls of the guide rail portions are connected between the respective top walls of the guide rail portions and the respective bottom walls of the guide rail portions to form grooves in the flat portions, respectively, the rails include boundary protrusions, respectively, each of the boundary protrusions includes a rail-side sloped wall and a securing portion-side sloped wall, the rail-side sloped wall faces the guide rail portion and slopes from the corresponding guide rail portion down toward an inner side of the vehicle, and the securing portion-side sloped wall faces the securing portion and slopes from a distal end of the rail-side sloped wall down toward the outer side of the vehicle.

9. The layout system according to claim 4, wherein the cargo side-trims include flat portions, the guide rail portions include sidewalls, top walls, bottom walls, and front walls, the sidewalls, the top walls, and the bottom walls of the guide rail portions extend in the front-rear direction of the vehicle, the top walls and the bottom walls of the guide rail portions project from the flat portions toward an outer side of the vehicle and the sidewalls of the guide rail portions are connected between the respective top walls of the guide rail portions and the respective bottom walls of the guide rail portions to form grooves in the flat portions, respectively, the rails include boundary protrusions, respectively, each of the boundary protrusions includes a rail-side sloped wall and a securing portion-side sloped wall, the rail-side sloped wall faces the guide rail portion and slopes from the corresponding guide rail potion down toward an inner side of the vehicle, and the securing portion-side sloped wall faces the securing portion and slopes from a distal end of the rail-side sloped wall down toward the outer side of the vehicle.

10. The layout system according to claim 9, wherein the sidewalls of the guide rail portions include upper portions and lower portions that are located on the outer side of the vehicle than the respective upper portions, the stoppers are portions of the sidewalls of the guide rail portions including upper ends of the portions connected to lower ends of the respective upper portions of the sidewalls of the guide rail portions and lower ends connected to upper ends of the respective lower portions, the first rod is a tension rod and held between the cargo side-trims with tension applied to the first rod in a width direction of the vehicle, the holders comprise sidewalls that extend upward from sides of the respective bottom walls of the holders on the outer side of the vehicle to lower ends of the lower portions of the sidewalls of the guide rail portions, each of the lower portions of the sidewalls of each of the guide rail portions and each of the sidewalls of each of the holders have dimensions measuring in the vertical direction such that a sum of the dimensions is about equal to an outer diameter of each of the end portions of the first rod, the rails comprise holding spaces each being defined at least by one of the stoppers, the lower portion of one of the sidewalls of the guide rail portions, the sidewall of corresponding one of the holders, and the bottom wall of the corresponding one of the holders, and the holding spaces are for holding the respective ends of the first rod that is extended when moved from the guide rail portions to the holding spaces.

11. The layout system according to claim 9, wherein the stoppers comprise surfaces that slope from the lower ends of the upper portions of the sidewalls of the respective guide rail portions to the upper ends of the lower portions of the sidewalls of the respective guide rail portions.

12. The layout system according to claim 1, wherein the guide rail portions include linear protrusions that protrude from the sidewalls of the respective guide rail portions and extend in a longitudinal direction of the guide rail portions.

13. The layout system according to claim 10, wherein the dimension of the upper portions of the sidewalls of the guide rail portions is in a range from 1/2 to 4/5 of the outer diameter of the end portions of the first rod.

14. The layout system according to claim 3, wherein the holders of each one of the front securing portions are arranged in the front-rear direction of the vehicle, and the holder in the front is located adjacent to a rear surface of a back seat.

* * * * *